US006981804B2

(12) United States Patent
Jian

(10) Patent No.: US 6,981,804 B2
(45) Date of Patent: Jan. 3, 2006

(54) VERTICALLY INTEGRATED OPTICAL DEVICES COUPLED TO OPTICAL FIBERS

(75) Inventor: Benjamin B. Jian, Fremont, CA (US)

(73) Assignee: Arrayed Fiberoptics Corporation, Sunnyvale, CA (US)

(*) Notice: Subject to any disclaimer, the term of this patent is extended or adjusted under 35 U.S.C. 154(b) by 322 days.

(21) Appl. No.: 10/147,155

(22) Filed: May 15, 2002

(65) Prior Publication Data

US 2003/0002809 A1 Jan. 2, 2003

Related U.S. Application Data

(63) Continuation-in-part of application No. 09/995,214, filed on Nov. 26, 2001, now Pat. No. 6,527,455, which is a continuation of application No. 09/327,826, filed on Jun. 8, 1999, now Pat. No. 6,328,482.

(60) Provisional application No. 60/291,169, filed on May 15, 2001, provisional application No. 60/088,374, filed on Jun. 8, 1998, provisional application No. 60/098,932, filed on Sep. 3, 1998.

(51) Int. Cl.
*G02B 6/36* (2006.01)

(52) U.S. Cl. .................................................... 385/88

(58) Field of Classification Search .................. 385/31, 385/33, 88–94

See application file for complete search history.

(56) References Cited

U.S. PATENT DOCUMENTS 4,835,381 A * 5/1989 Sorensen, III .......... 250/237 R
5,093,879 A * 3/1992 Bregman et al. ............. 385/93
5,155,785 A * 10/1992 Holland et al. ............... 385/89
5,195,150 A 3/1993 Stegmueller et al.
5,346,583 A 9/1994 Basavanhally
5,501,893 A 3/1996 Laermer et al.
5,790,730 A 8/1998 Kravitz et al. ................ 385/49
5,846,638 A 12/1998 Meissner .................... 428/220
5,859,940 A * 1/1999 Takahashi et al. ............ 385/34
5,917,626 A * 6/1999 Lee ............................ 398/88
6,267,515 B1 * 7/2001 Okuda et al. ................. 385/88
6,483,961 B1 11/2002 Helkey et al. ................ 385/18
6,748,140 B1 * 6/2004 Wu et al. ..................... 385/39
2001/0024556 A1 * 9/2001 Beguin et al. .............. 385/125

OTHER PUBLICATIONS

Iga, K., "Active Parallel Microoptics", SPIE vol. 1319 Optics in Complex Systems, 1990.

Iga, "Distributed-index planar microlens and stacked planar optics: a review of progress", Applied Optics, vol. 25, No. 19, Oct. 1, 1986.

(Continued)

*Primary Examiner*—Vip Patel
*Assistant Examiner*—Peter Macchiarolo
(74) *Attorney, Agent, or Firm*—JDI Patent; Joshua D. Isenberg

(57) ABSTRACT

Integrated optical devices in which one or more optical fibers are vertically integrated with other optical components in a multilayer arrangement. Optical components include lenses, etalons that may be passive or actuable, WDM filters and beamsplitters, for example. One vertically integrated optical device comprises a fiber socket layer comprising a plurality of sockets including a first socket and second socket arranged proximate to each other, and a lens that has a central axis offset from the cores of the first and second fibers. Optical devices include filters, variable optical attenuators, and switches, for example. A component layer may comprise a spacer layer that provides a predetermined opening that is hermetically sealed to protect sensitive components, such as MEMS devices. Also, a method of forming a socket layer using a two-sided etching process is disclosed. Furthermore, an integrated laser device is disclosed that includes a laser layer.

22 Claims, 17 Drawing Sheets

OTHER PUBLICATIONS

Iga, "Fundamentals of Microoptics", Academic Press, 1984, 1984, p.p.6-7.
Iga, "Fundamentals of Microoptics", Academic Press, 1984, p.p.195-207.
Iga, "Stacked planar optics: an application of the planar microlens", Applied Optics, vol. 21, No. 19, Oct. 1, 1982.
Lee et al., "Low Cost High Quality Fabrication Methods and CAD for Diffractive Optics and Computer Holograms Compatible with Micro-Electronics and Micro-Mechanics Fabrication" Diffractive Optics and Optical Microsystems, Martellucci and Chester, editors, Plenum Press, New York, 1997, pp. 133-138.
Matsuda et al., "A Surface-Emitting Laser Array with Backside Guiding Holes for Passive Alignment to Parallel Optical Fibers", IEEE Photonics Technology Letters, vol. 8, No. 4, (1996) pp. 494-496.
Paoletti et al., "15-GHz Modulation Bandwidth, Ultralow-Chirp 1.55-μm Directly Modulated Hybrid Distributed Bragg Reflector (HDBR) Laser Source", IEEE Photonics Technology Letters, vol. 10, No. 12, Dec. 1998.
Timofeev et al., "2.6 Gbit/s dense WDM transmission in standard fibre using directly-modulated fibre grating lasers", Electronics Letters, vol. 33, No. 19, Sep. 11, 1997, pp. 1632-1633.

* cited by examiner

VERTICALLY INTEGRATED OPTICAL DEVICES COUPLED TO OPTICAL FIBERS

CROSS REFERENCE TO RELATED APPLICATIONS

Priority is claimed to U.S. Provisional Application No. 60/291,169, filed May 15, 2001 entitled INTEGRATED FIBEROPTIC COMPONENTS, which is incorporated by reference herein.

This is a continuation-in-part of U.S. patent application Ser. No. 09/995,214 filed Nov. 26, 2001, now U.S. Pat. No. 6,527,455, entitled MULTILAYER OPTICAL FIBER COUPLER, incorporated by reference herein, which is a continuation of U.S. patent application Ser. No. 09/327,826, filed Jun. 8, 1999, now U.S. Pat. No. 6,328,482 B1, issued Dec. 11, 2001, entitled MULTILAYER OPTICAL FIBER COUPLER, which claims the benefit of U.S. Provisional Application No. 60/088,374, filed Jun. 8, 1998, entitled LOW COST OPTICAL FIBER TRANSMITTER AND RECEIVER and U.S. Provisional Application No. 60/098,932, filed Sep. 3, 1998 entitled LOW COST OPTICAL FIBER COMPONENTS, all of which are incorporated by reference herein.

BACKGROUND OF THE INVENTION

1. Field of the Invention

The present invention generally relates to optical devices coupled to optical fibers, and particularly to optical fiber-coupled devices that can be formed in large numbers using wafer-level techniques.

2. Description of Related Art

Optical fibers have by far the greatest transmission bandwidth of any conventional transmission medium, and therefore optical fibers provide an excellent transmission medium. An optical fiber is a thin filament of drawn or extruded glass or plastic having a central core and a surrounding cladding of lower index material to promote internal reflection. Optical radiation (i.e. light) is coupled (i.e. launched) into the end face of an optical fiber by focusing the light onto the core. For effective coupling, light must be directed within a cone of acceptance angle and inside the core of an optical fiber. Because any optical radiation outside the core or acceptance angle will not be effectively coupled into the optical fiber, it is important to precisely align the core with an external source of optical radiation.

A fiber optic coupler for coupling optical radiation between an optical device and an optical fiber is disclosed in U.S. Pat. No. 6,328,482 B1, issued Dec. 11, 2001, entitled MULTILAYER OPTICAL FIBER COUPLER, which is incorporated by reference herein. The '482 patent discloses, inter alia, a multiplayer optical fiber coupler that includes a first layer that defines a fiber socket in which an optical fiber is situated, and a second layer coupled to the first layer.

It would be an advantage to provide optical fiber-coupled devices that provide functions such as filters, switches, and multiplexers/demultiplexers, and in which the optical fiber is integrated into the optical device.

Conventional optical devices generally require costly and time-consuming alignment steps to ensure efficient coupling to optical fibers. For example, one conventional practice for making a fiber-pigtailed transmitter is to assemble an edge-emitting laser diode, an electronics circuit, a focusing lens, and a length of optical fiber and then manually align each individual transmitter. To align the transmitter, the diode is turned on and the optical fiber is manually adjusted until the coupled light inside the fiber reaches a predetermined level. Then, the optical fiber is permanently affixed by procedures such as UV-setting epoxy or laser welding. This manual assembly procedure is time consuming, labor intensive, and expensive. Up to 80% of the manufacturing cost of a fiber-pigtailed module can be due to the fiber alignment step. The high cost of aligning optical fiber presents a large technological barrier to cost reduction and widespread deployment of optical fiber modules.

SUMMARY OF THE INVENTION

Integrated optical devices are disclosed herein in which one or more optical fibers are vertically integrated with other optical components in a multilayer arrangement. Particularly, the integrated devices include one or more optical fibers inserted into a fiber socket in fiber socket layer, and other optical components vertically integrated into one or more layers aligned with, and attached to the optical fiber socket layer.

In one embodiment, a vertically integrated optical device comprises a fiber socket layer comprising a plurality of sockets including a first socket and second socket arranged proximate to each other. A first optical fiber may be situated in the first socket and a second optical fiber may be situated in the second socket. A plurality of component layers are coupled to the fiber socket layer including a first component layer that includes a first optical component and a second component layer that includes a second optical component. The first and second optical components are arranged for optically coupling the first optical fiber with the second optical fiber via the first and second optical components. The first optical component may comprise a lens that defines a central axis, and the first and second optical fibers are aligned offset from the central axis.

Optical components that may be included in the structure include an actuable mirror that provides a variable optical attenuator device. The mirror may be partially transparent, and the device may further comprise a photodetector situated opposite the mirror from the optical fibers. Other optical components include an etalon, either passive or actuable.

A component layer may comprise a spacer layer that provides a predetermined opening that is hermetically sealed to protect sensitive components, such as MEMS devices.

The device may comprise a second fiber socket layer on the structure opposite the first fiber socket layer. One or more optical fibers may be situated in sockets in the second fiber socket layer. The optical fibers in the second socket layer may be optically coupled to the optical fibers in the first socket layer. In one embodiment, a first optical component comprises a first lens that defines a central axis, and first and second optical fibers in the first layer are aligned offset from the central axis, and a second optical component comprises a second lens that defines a second central axis, and a third optical fiber in the second layer is aligned offset from the central axis. A dielectric (e.g. WDM) filter may situated between the first and second lenses, the WDM filter arranged so that an input beam from the first optical fiber interacts with the WDM filter, thereby separating the input beam into a reflected beam that is coupled into the second optical fiber and a transmitted beam that is coupled into the third optical fiber.

Also, a method of forming a socket layer for holding a plurality of optical fiber is disclosed, comprising forming a first mask on a first surface of a wafer, the first mask defining a pattern including a first plurality of socket openings, forming a second mask on a second, opposing surface of the wafer, the second mask including a second plurality of socket openings aligned with the first plurality of socket holes. The exposed first surface is etched to between about one-half the thickness of the wafer and the full thickness of the wafer, and then the second surface is etched through the other side to provide a socket between the socket openings in the first and second masks.

Additionally, an integrated laser device is disclosed comprising a fiber socket layer including a fiber socket, an optical fiber situated in the fiber socket, a first component layer connected to the socket layer, the first component layer comprising a microlens. A laser layer that comprises a semiconductor material is connected to the first component layer, including a laser facet formed on a surface of the laser layer, a turning mirror formed on the surface, and an in-plane waveguide defined between the laser facet and turning mirror. A partial reflector is situated proximate to the optical fiber, the partial reflector and the laser facet defining a laser cavity. The turning mirror may comprise an etched mirror that is approximately 45° to the surface, thereby providing a 90° turning mirror. An etalon, passive or actuable, may be situated within the laser cavity.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

This invention is described in the following description with reference to the figures, in which like numbers represent the same or similar elements.

Glossary of Terms and Acronyms

The following terms and acronyms are used throughout the detailed description:

| | |
|---|---|
| InP | Indium Phosphide |
| MEMS | micro-electro-mechanical system |
| the '482 patent | U.S. Pat. No. 6,328,482 B1, issued Dec. 11, 2001, entitled MULTILAYER OPTICAL FIBER COUPLER |
| VFI technique | Vertical fiber integration technique |
| VOA | Variable optical attenuator |
| WDM | Wavelength division multiplexing |
| WDM filter | A filter, such as a multilayer dielectric coating that separates an optical signal by wavelength into a reflected beam and a transmitted beam |

Overview

Figure 1:
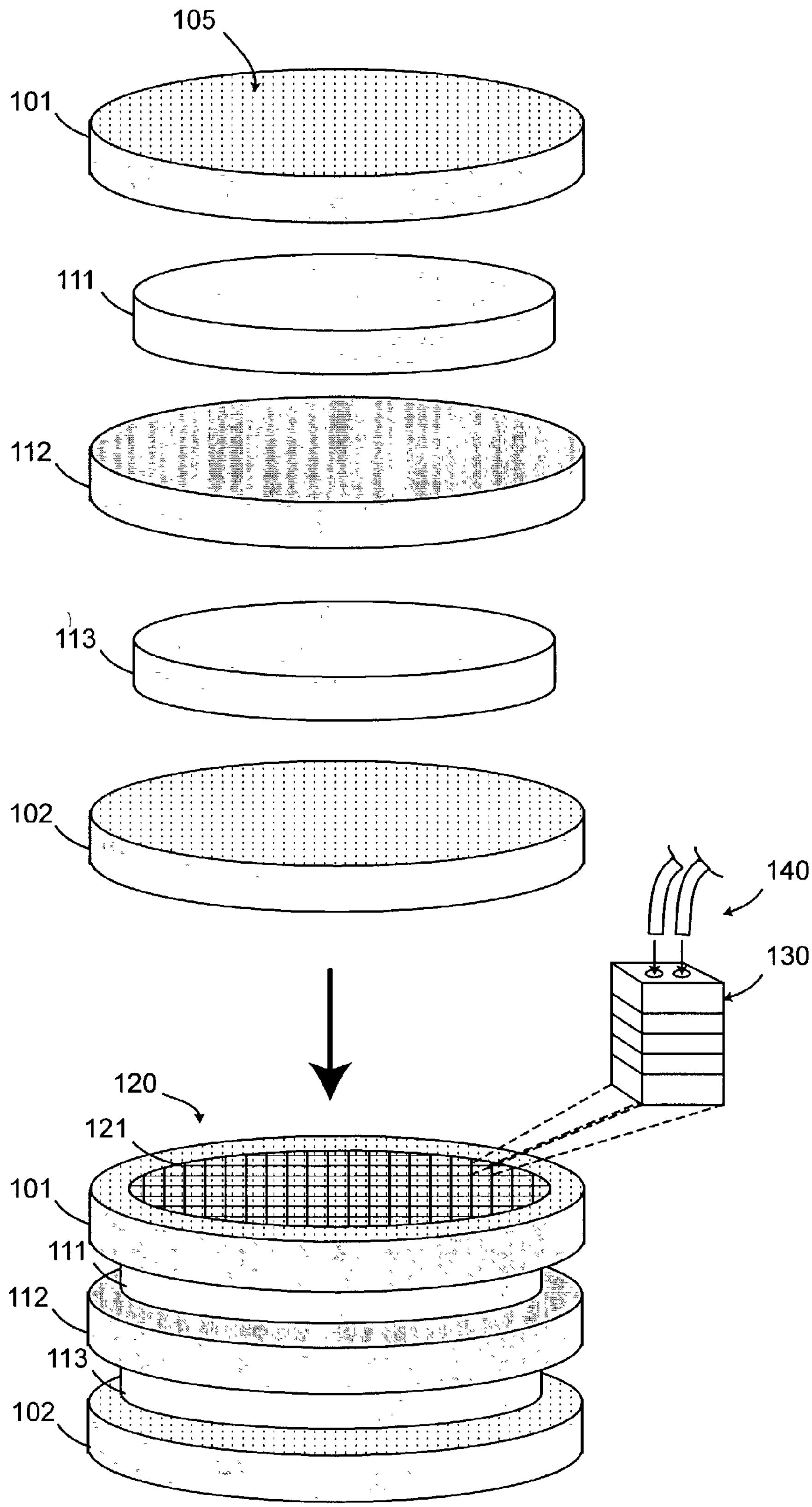
FIG. 1 is perspective view of a plurality of wafers, illustrating fabrication of a wafer stack and individual devices.

FIG. 1 is a diagram that generally illustrates steps for making a vertically integrated device as described herein. First and second socket wafers 101 and 102 are formed with a plurality of fiber sockets shown generally at 105 that are created to hold optical fibers. First, second, and third component wafers 111, 112, and 113, which can include a variety of optical devices, are situated between the first and second socket wafers. The socket wafers and the component wafers are bonded to provide a wafer stack shown generally at 120 for device integration in the wafer surface-normal (vertical) direction, in contrast to conventional planar waveguide technology.

Once the wafer stack has been created, the individual devices on the wafer structure are then broken out by appropriate processes such as "slice and dice" along a grid pattern 121. One device is shown at 130 after being been broken off from the wafer stack. The optical fibers 140 are then inserted into the sockets in the device 130. This technology is generally referred to herein as "vertical fiber integration" ("VFI") technology. Advantageously, the VFI devices are manufacturable in large batches.

U.S. patent application Ser. No. 09/327,826, now U.S. Pat. No. 6,328,482 B1, entitled "Multilayer Optical Fiber Coupler", incorporated by reference herein, discloses a multiplayer structure that includes fiber socket technology to align an optical fiber with other optical components situated on other layers. The fiber socket technology disclosed in the '482 patent is utilized herein in a variety of configurations, with multiple component layers to make ultra-low cost optical fiber components.

A variety of devices are disclosed herein as examples that can be implemented using vertical fiber integration technology, including passive optical devices and active optical devices. The passive devices include add/drop filters, and wavelength division multiplexers/demultiplexers, variable optical attenuators, fiber optic switches, and tunable filters. Active devices include fiber optic receivers, laser transmitters and wavelength tunable lasers. Using this technology and these examples, a wide variety of devices can be implemented. In addition to those techniques, additional techniques may be useful such as a wafer level hermetic sealing process disclosed herein, which is useful for the VOA device and any other application that requires space between one layer and another. To illustrate one fabrication process, steps for making the add/drop filter device will be discussed with reference to FIGS. 5A to 5M; it should be apparent that the other devices described herein could be implemented using similar techniques.

Add/Drop Filter

An add/drop filter is a fiber optic device that separates a multi-wavelength input beam into two separate output beams with different wavelengths. Conventionally, add/drop filters may be constructed by using a WDM thin film dielectric filter situated between two collimators. One collimator has two fiber pigtails, one of the pigtails providing the input beam and the other pigtail receiving the beam reflected from the dielectric (e.g. WDM) filter. The other collimator has one fiber pigtail that receives the beam transmitted through the WDM filter.

Figure 2:
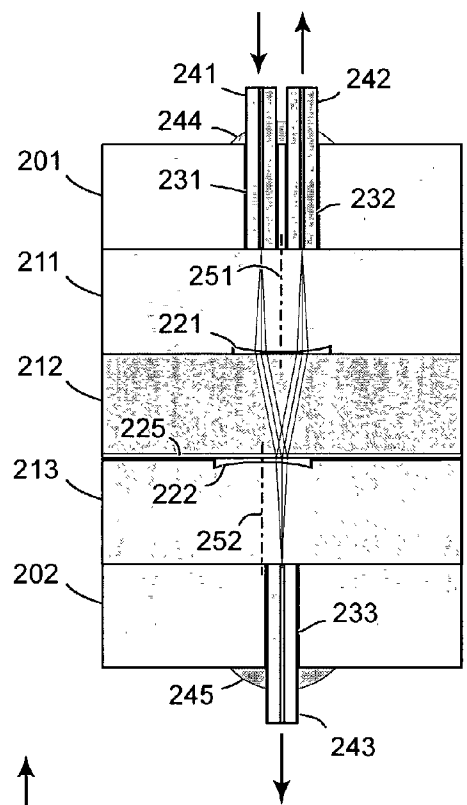
FIG. 2 is a cross-sectional view of a three port, integrated optical fiber filter structure.

FIG. 2 is a cross-sectional view of a three port, integrated optical fiber filter structure that includes five layers aligned and bonded together, including a first fiber socket layer 201 and a second fiber socket layer 202 that have vertical sockets extending therethrough, dimensioned for receiving the optical fibers. The socket layer comprises any suitable material, such as silicon. As will be described, the sockets are arranged in a predetermined alignment with respect to other optical components in the structure.

Component layers 211, 212, and 213 are situated between the first and second fiber socket layers. The first component layer 211 includes a first microlens 221 that has its focal plane proximate to the interface between the first fiber socket layer 201 and the first component layer 211. The third component layer 213 includes a second microlens 222 that has its focal plane proximate to the interface between the second fiber socket layer 202 and the third component layer 213. In this embodiment, the microlenses comprise refractive elements. The second component layer has a dielectric thin film coating 225 on one surface to provide a WDM filter. The component layers comprise any suitable material such as glass.

The first fiber socket layer 201 comprises a first fiber socket 231 that receives a first optical fiber 241 and a second fiber socket 232 proximate thereto that receives a second optical fiber 242. The second fiber socket layer 202 comprises a third fiber socket 233 that receives a third optical fiber 243. The optical fibers 241, 242, and 243 are permanently affixed inside their fiber sockets by optical epoxy 244 and 245. The optical fibers 241, 242, and 243 typically comprise single mode fibers such as used for telecommunications purposes; however, other optical fibers, such as multimode fibers, may be used.

The optical fibers are arranged within their respective sockets so that their ends are proximate to the interface between the socket layer and the component layer. The first and second microlenses are positioned within the structure so that their focal planes are proximate to respective interfaces between the component layer and the socket layer, and therefore the focal planes approximately coincide with the ends of the respective optical fibers.

It is a well known property of geometrical optics that a beam of light originating from a point on the focal plane is collimated by the lens into a parallel beam of light. If the point is on-axis, the output beam is parallel to the optical axis. If the point is off-axis, the output beam is at an angle to the lens' optical axis. This property is used in the design of the integrated optical fiber filter herein.

The sockets are formed with respect to the microlenses so that the optical fibers are off-axis. Particularly, the first microlens 221 defines a first central optical axis 251 that is offset from the core of the first and the second fibers 241 and 242. In the embodiment shown in FIG. 2, the cores of the first and second fibers are positioned on opposite sides of the first central axis 251 and approximately equidistant therefrom so that light exiting from the first fiber 241 and reflecting from the WDM filter 225 is coupled into the second fiber 242. The second microlens 222 defines a second central optical axis 252 that is offset from the core of the third fiber 243.

In one example, the first fiber 241 is the input fiber, the second fiber 242 is a reflected output fiber, and the third fiber 243 is a transmitted output fiber. The fiber sockets, microlenses, and WDM filter are all arranged so that input light entering the input fiber is collimated by the first microlens 221 to form an approximately parallel beam with a finite beam angle with respect to the first central axis 251, due to the off-axis arrangement of the optical fiber. The light beam impinges on the multi-layer WDM filter 225 and the light beam then is split into reflected light and transmitted light depending on the spectral property of the thin film filter 225. The reflected light beam is tilted back to surface normal direction by the first microlens 221 and coupled into the core of the reflected output fiber 242. The transmitted light beam from the WDM filter 225 is focused by the second microlens 222 into the core of the transmitted fiber. Again the off-axis arrangement of the second microlens 222 with respect to the fiber 243 tilts the angled beam back to surface normal direction before coupling it into the transmitted output fiber 243.

The dielectric filter 225 can take many forms. The variety of dielectric thin film filters makes the add/drop filter disclosed herein a very useful structure that can be used in a number of applications by choosing a different filter. Possible devices that can be made using this structure include an add/drop WDM filter, a 1480 nm/1550 nm pump coupler or a 980 nm/1550 nm pump coupler, a fiber tap coupler, and/or a 1×2 beam splitter. A wide variety of filters are possible, such as a broadband filter, a narrow band filter, a high pass or a low pass filter, and an amplified spontaneous emission noise rejection filter. This filter can be a simple beam splitter coating.

Figure 3:
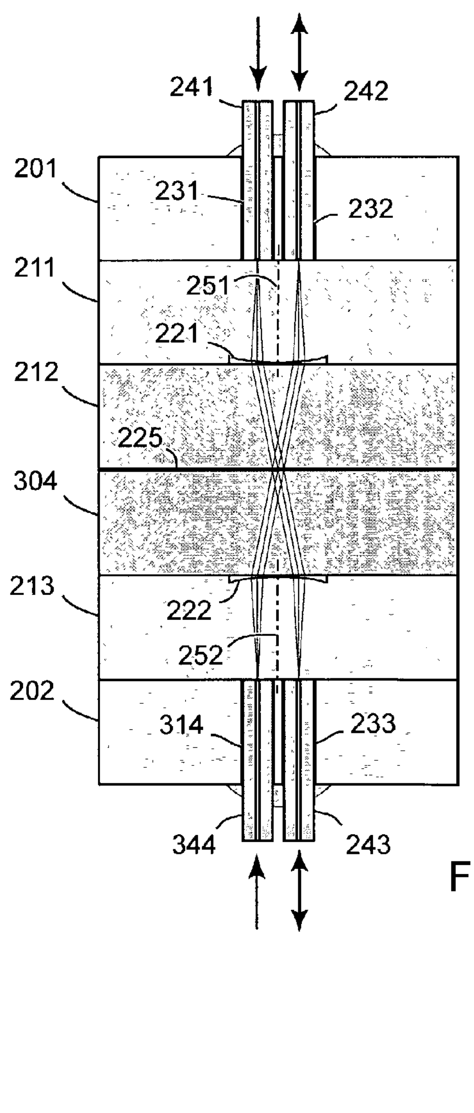
FIG. 3 is cross-section of an alternative embodiment to FIG. 2 that comprises a four port fiber filter structure that can be used as a 2×2 fiber coupler.

FIG. 3 is cross-section of alternative embodiment to FIG. 2 that comprises a four port fiber filter structure that can be used as a 2×2 fiber coupler. FIG. 3 includes, in addition to the elements described with reference to FIG. 2, an additional layer 334, that positions the WDM filter 225 approximately midway between the first and second microlenses 221 and 222. However, in the embodiment of FIG. 3 the first and second axes are approximately aligned, rather than being offset. A fourth fiber socket 314 is provided in the second socket layer 202, and a fourth fiber 344 is situated therein. The fourth fiber socket 314 situates the fourth fiber 344 offset from the second axis 252. Particularly, the fourth fiber socket 314 positions the fourth fiber 344 on the opposite side of the second axis 252 from the third optical fiber 243. The third and fourth fibers are approximately equidistant from the second axis 252; i.e. the second axis 252 is approximately midway between the third and fourth fibers. In operation, the 2×2 coupler of FIG. 3 utilizes the fourth fiber 344 to receive a second input, the third fiber 243 receives a second reflected output in addition to the first transmitted output, and the second fiber 242 receives a second transmitted output in addition to the first reflected output.

Figure 4:
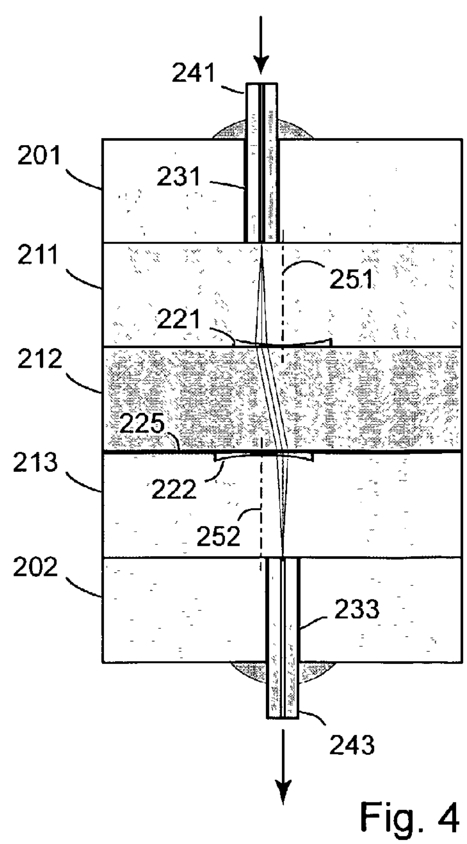
FIG. 4 is a cross-sectional view of a two-port (in-line) fiber 1×1 filter, which is a alternative embodiment to the 1×2 filter shown in FIG. 2.

FIG. 4 is a cross-sectional view of a two-port (in-line) fiber 1×1 filter, which is a modification of the 1×2 filter shown in FIG. 2. The 1×1 design shown in FIG. 4 eliminates the reflected output fiber 242, and provides a single transmitted output on the output fiber 243, which may be cost effective in applications where only a single output is required.

Figure 5A:
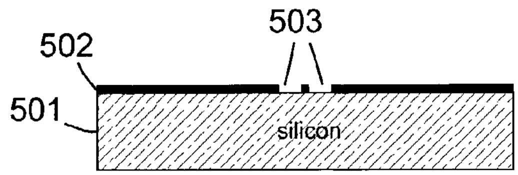
FIGS. 5A, 5B, 5C, 5D, 5E, 5F, 5G, 5H, 5I, 5J, 5K, and 5M are cross-section of wafers that illustrate one fabrication process for making the three-port integrated fiber filter of FIG. 2.

FIG. 5A is a cross-section of a portion of a double-side polished silicon substrate 501. A $SiO_2$ etch mask 502 is deposited on the silicon substrate 501. In one embodiment the thickness of the silicon wafer is about 500 μm, and the $SiO_2$ mask 502 is deposited to a thickness of around 10 μm. The $SiO_2$ mask 502 has a fiber socket pattern 503 that defines a plurality of fiber sockets. In one embodiment the diameter of the fiber sockets is about 126 μm in diameter, which will accommodate standard single mode optical fibers. One method of making the fiber sockets using a two-sided etch hole is described with reference to FIGS. 16A to 16D.

Figure 5B:
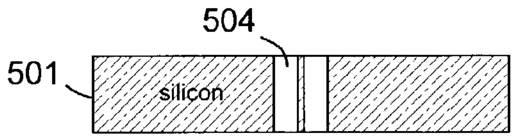

FIG. 5B shows the silicon substrate 501 with two fiber sockets 504 formed therein, and the $SiO_2$ mask stripped. The fiber sockets are precision vertical holes etched all the way through the silicon substrate. This process creates the first and second socket layers 201 and 202 shown in FIG. 2. The fiber sockets 504 are formed by a process such as dry etching using a deep silicon etch process, such as the Bosch process using a deep RIE etcher, for example. The '482 patent, incorporated by reference, also discloses methods for forming the sockets.

Figure 5C:
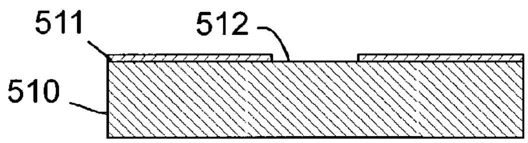

FIG. 5C is a cross-section of a glass wafer 510 (e.g. fused silica) that will be formed into a component layer with a microlens component. A high selectivity hard mask 511 is deposited on the glass wafer 510 and photolithographically patterned into a pattern that includes an exposed section 512 that has a shape to allow creation of a recessed microlens, as will be described.

Figure 5D:
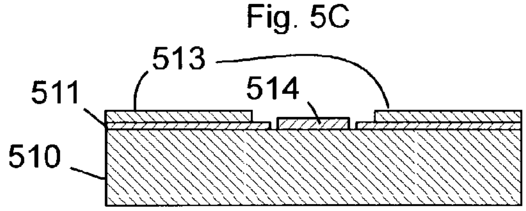

Referring to FIG. 5D, the photoresist is deposited onto the wafer assembly and photolithographically patterned into a pattern for microlens fabrication. FIG. 5D shows the wafer 510 after photoresist 513 has been spun thereon in a pattern that creates a cylinder 514 of photoresist.

Figure 5E:
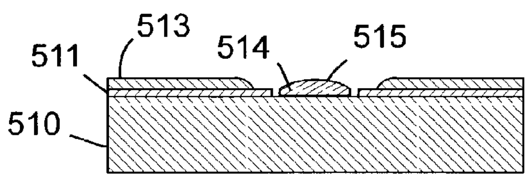

Referring to FIG. 5E, the photoresist is reflowed to form a spherical surface 515 on the photoresist. FIG. 5E shows the photoresist cylinder 514 after being reshaped by melting the photoresist in an oven. The surface tension of the melted photoresist creates a spherical surface, which will to act as an etch mask for creating microlenses.

Figure 5F:
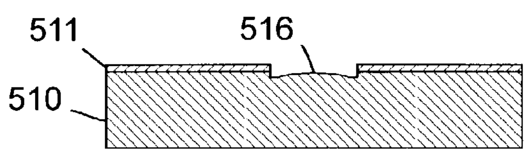

Referring to FIG. 5F, the spherical surface is transferred to glass using a dry etcher. Particularly, the glass wafer 510 is etched using the reflow photoresist/hard mask combination as mask layers to form a microlens 516. FIG. 5F shows the resulting microlens 516 after the photoresist is completely etched away and the spherical surface is transferred onto the glass surface.

Figure 5G:
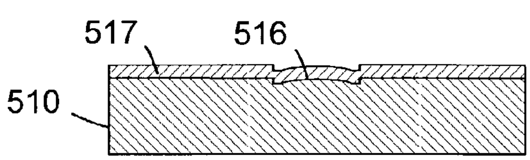

Referring to FIG. 5G, the hard mask 511 is stripped in a suitable environment. An anti-reflection (AR) coating 517 may be deposited on the surface of the microlens 516.

The process described above with reference to FIGS. 5C to 5G is used to create the microlenses on the component layers such as the first and third component layers 211 and 213 (FIG. 2).

Figure 5H:
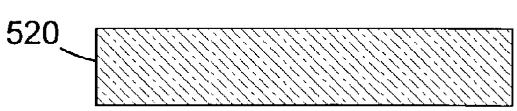

Referring now to FIG. 5H, a glass wafer 520 with a suitable wafer thickness and surface smoothness is provided for forming a dielectric (e.g. WDM) filter thereon. The qualities and dimensions of the glass wafer 520 are determined by the requirements of the final structure. For example, depending on the application, the material in the glass wafer 520 can be a low thermal expansion coefficient glass or fused silica glass.

Figure 5I:
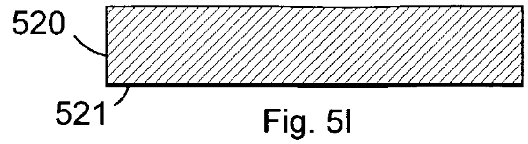

Referring to FIG. 5I, a suitable dielectric thin film filter coating 521 is deposited on one side of the glass wafer 521 to provide a WDM filter.

Figure 5J:
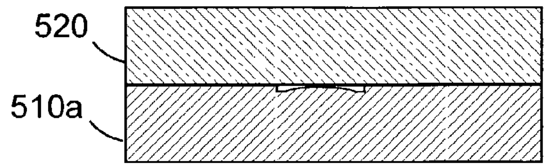

Referring to FIG. 5J, the glass wafer 521 is aligned and bonded to the bottom microlens layer 510*a*.

Figure 5K:
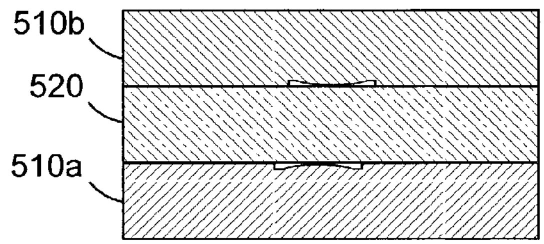

Referring to FIG. 5K, the two-wafer stack from the previous step (FIG. 5J) is aligned and bonded to the top microlens layer 510*b* to create a three wafer stack.

Figure 5L:
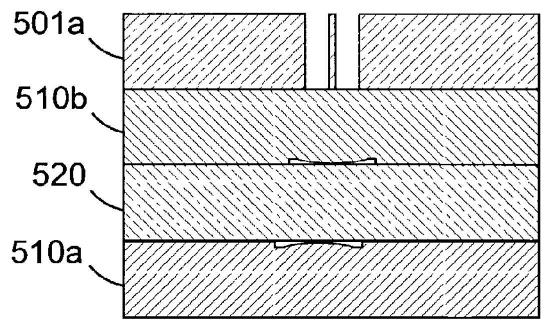

Referring to FIG. 5L, the three-wafer stack from the previous step (FIG. 5K) is aligned and bonded to a top socket layer 501*a* to create four-wafer stack.

Figure 5M:
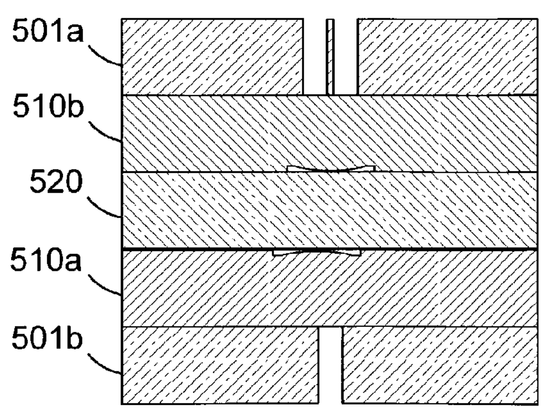

Referring to FIG. 5M, the four-wafer stack from the previous step (FIG. 5L) is aligned and bonded to a bottom socket layer 501*b* to create the final five-wafer stack.

This creates the finished filter structure shown in FIG. 2: particularly the top and bottom socket layers 501*a* and 501*b* correspond to the first and second socket layers 201 and 202, the top and bottom microlens layers 510*a* and 510*b* correspond to the first and third component layers 211 and 213, and the glass wafer 520 (with the dielectric coating) corresponds to the second component layer 212.

The finished wafer stack is further diced up into chips. Optical fibers are inserted into the fiber sockets with a small amount of epoxy to permanently fix the fiber inside the fiber socket.

Wavelength Division Multiplexer and Demultiplexer

Currently wavelength division multiplexing (WDM) is causing a revolution in optical fiber communications, since it is the most practical means for increasing the transmission capacity of installed optical fiber cables (e.g. up to 160 fold) without laying new fibers, simply by transmitting multiple wavelengths through the same optical fiber. In a WDM system, multiplexer devices multiplex any number of optical wavelengths into a single fiber at the transmitting end. At the receiving end of the fiber, demultiplexers separate the single beam into its constituent wavelengths.

Figure 6:
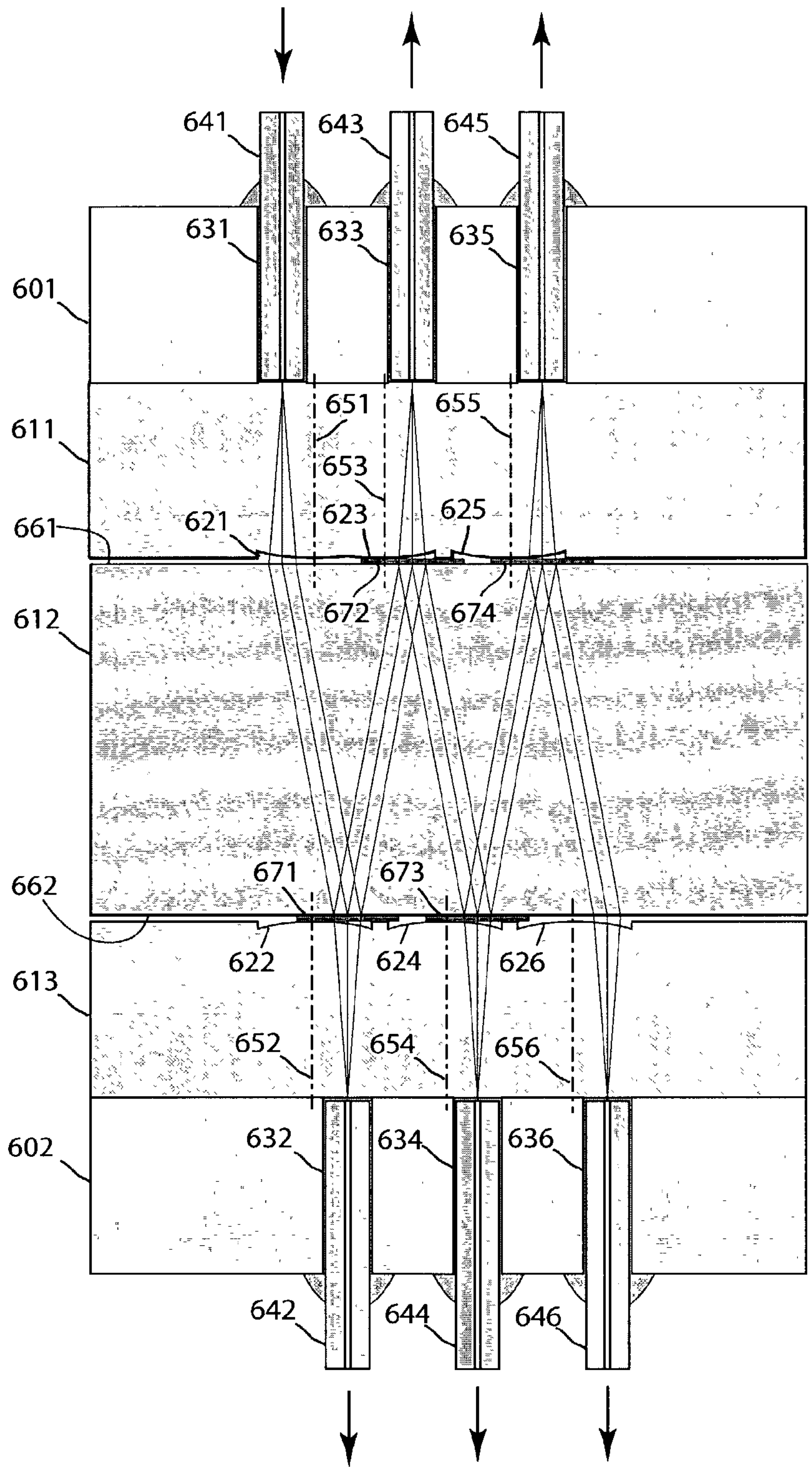
FIG. 6 is a cross-sectional view of a multi-channel WDM demultiplexer.

FIG. 6 is a cross-sectional view of a multi-channel WDM demultiplexer, which can also be used as a multiplexer by reversing the inputs and outputs. The embodiment in FIG. 6 includes a first socket layer 601 and a second socket layer 602 that have a plurality of sockets extending therethrough, and first, second, and third component layers 611, 616, and 613 situated between the first and second socket layers 601 and 602. The socket layers 601 and 602 comprise any suitable material such as silicon, and the component layers comprise any suitable material such as glass.

The first and second socket layers include a plurality of sockets formed in a predetermined alignment with respect to the other optical components in the structure. The first socket layer 601 comprises a first socket 631 that receives a first optical fiber 641, a third socket 633 that receives third optical fiber 643, and a fifth socket 635 that receives a fifth optical fiber 645, all arranged in a proximate relationship to each other. The second fiber socket layer 602 comprises a second fiber socket 632 that receives a second optical fiber 642, a fourth fiber socket 644 that receives a fourth optical fiber 644, and a sixth socket 636 that receives a sixth optical fiber 646, all arranged in a proximate relationship to each other. The optical fibers are arranged within their respective sockets so that their ends are proximate to the interface between the socket layer and the adjacent component layer. The optical fibers typically comprise single mode fibers such as used for telecommunications purposes; however, other optical fibers, such as multimode fibers, may be used.

The first and third component layers include a plurality of microlenses. Particularly, the first component layer 611 includes a first microlens 621, a third microlens 623, and a fifth microlens 625 whose focal planes are proximate to the interface between the first fiber socket layer 601 and the first component layer 611. The third component layer 613 includes a second microlens 622, a fourth microlens 624, and a sixth microlens 626 whose focal planes are proximate to the interface between the second fiber socket layer 602 and the third component layer 613. Because each of the optical fibers is arranged within its respective socket so that its end is proximate to the interface between the socket layer and the component layer, the focal planes of the microlenses approximately coincide with the ends of the respective optical fibers.

Each of the sockets is aligned with respect to its respective microlens so that its optical fiber is off-axis from the central axes defined by the microlens. Particularly, the first microlens 621 defines a first central optical axis 651 that is offset from the core of the first fibers 641. The second microlens 622 defines a second central optical axis 652 that is offset from the core of the second fiber 642. The third microlens 623 defines a third central optical axis 653 that is offset from the core of the third fiber 643. In the embodiment shown in FIG. 6, the cores of the first and third fibers are positioned on opposite sides of the first and third central axes 651 and 653, and approximately equidistant therefrom so that light from the first fiber 641 reflecting from the dielectric (e.g. WDM) filter 671 is coupled into the third fiber 643. The fourth microlens 624 defines a fourth central optical axis 654 that is offset from the core of the fourth optical fiber 644, the fifth microlens 625 defines a fifth central optical axis 655 that is offset from the core of the fifth optical fiber 635, and the sixth microlens 625 defines a sixth central optical axis 656 that is offset from the core of the sixth optical fiber 636.

The second component layer 612 has a plurality of WDM filters formed on both an upper surface 661 and a lower surface 662, each having a different center wavelength to select (transmit) a particular predetermined wavelength signal. A first WDM filter 671 is formed on the lower surface proximate to the second microlens 622, a second WDM filter 672 is formed on the upper surface proximate to the third microlens 623, a third WDM filter 673 is formed on the lower surface proximate to the fourth microlens 624, and a fourth WDM filter 674 is formed on the upper surface proximate to the fifth microlens 625. In this embodiment, four WDM filters are shown for purpose of illustration thereby providing four WDM output wavelengths (and a fifth output that includes all other wavelength(s) not transmitted by the four WDM filters). it should be apparent that the WDM filter/microlens/optical fiber operate as a unit, and that, in other embodiments, additional units can be added as desired.

The WDM filters can take many forms including dielectric thin film coatings. The variety of dielectric thin film filters makes the WDM filter disclosed herein a very useful structure that can be used in a number of applications by choosing a different wavelength filter. For example, the WDM filters may comprise beamsplitter coatings, and in such an embodiment an array of 1×N beamsplitters can be provided.

In operation, the demultiplexer shown in FIG. 6 resembles the add/drop filter described with reference to FIG. 2 in optical principle except that there are several WDM filters with different center wavelengths on the same wafer, and light bounces up and down between the WDM filters until it is transmitted through one of the WDM filters The first fiber 641 is the input fiber. After entering through the input fiber port, light near the center wavelength of the first WDM filter 671 is transmitted therethrough and coupled into the second optical fiber 642 to provides a single wavelength output. Any light not transmitted is reflected toward the second WDM filter 672, where it is either transmitted and coupled into the third optical fiber 643, or reflected to the third WDM filter 673. In this manner, light bounces up and down between the WDM filters until, finally, all the remaining light exits from the structure coupled into the sixth optical fiber 646. In summary, each time light hits a WDM filter, one wavelength is transmitted, as determined by the WDM filter, while the other wavelengths are reflected. This way, as the input beam reflects from WDM filter to WDM filter, a different wavelength is separated at each interaction with the WDM filter and coupled into a respective fiber. Furthermore, although the structure in FIG. 6 is described as a demultiplexer with a single input and several single wavelength outputs, it could also be used as a multiplexer by reversing the inputs and outputs; i.e. providing single wavelength inputs to the second, third, fourth, fifth, and/or sixth fibers, and receiving a multiplexed output on the first fiber.

The manufacturing process for the WDM demultiplexer can be accomplished using the principles as described for example with reference to the add/drop filter (FIGS. 5A to 5M). One difference is that multiple WDM thin film filters with different center wavelengths are patterned on the same wafer. This task can be achieved using a patterned thin film filter process, such as disclosed in U.S. Pat. No. 3,914,464, entitled "Striped Dichroic Filter and Method for Making the Same", which is incorporated by reference herein. In this process, a photolithographic liftoff mask is prepared before each thin film filter deposition. The liftoff mask patterns the thin film filter. For a multiple wavelength WDM demultiplexer, multiple thin film deposition and liftoff steps are performed to create the corresponding filters for each of the wavelengths. In principle this structure can be used to produce any WDM demultiplexer including dense WDM demultiplexers; however, it may be less costly to produce coarse WDM demultiplexers (e.g. demultiplexers with wide channel spacing) rather than DWDM (dense WDM) filters with narrow channel spacing (e.g. 100 GHz and 200 GHz).

Due to the small size of the parallel optical beams (80 $\mu$m diameter typical), the beam widening at each subsequent reflection due to diffraction could become significant in some embodiments if there are more than eight consecutive dielectric filters. If this is the case, relay microlenses (not shown) may be incorporated into the two WDM filter surfaces to effectively collimate the light beam. The relay microlens structure can be made, for example, by bonding two WDM filter wafers, one of which has a relay microlens made on the back surface, so that the relay microlens is sandwiched in the middle between the two WDM filter wafers. Another function of the relay microlenses is to ensure that the light beams strike the WDM filter surfaces with a flat wave front, since the transmission of the WDM filter is sensitive to the incident angle. If the light beam does not strike the WDM surface with a flat wave front, it could cause crosstalk between different wavelength channels.

Variable Optical Attenuator (VOA) Arrays

Due to the number of channels in WDM networks, and particularly due to the very large number of channels in DWDM networks, there is an urgent market need for variable optical attenuators (VOAs) that can be used to attenuate the optical power in a fiber. An array of the VOAs described herein can be used, for example, to adjust the input power of each of the input beams at each wavelength before multiplexing the beams together in a multiplexer such as discussed with reference to FIG. 6.

Figure 7:
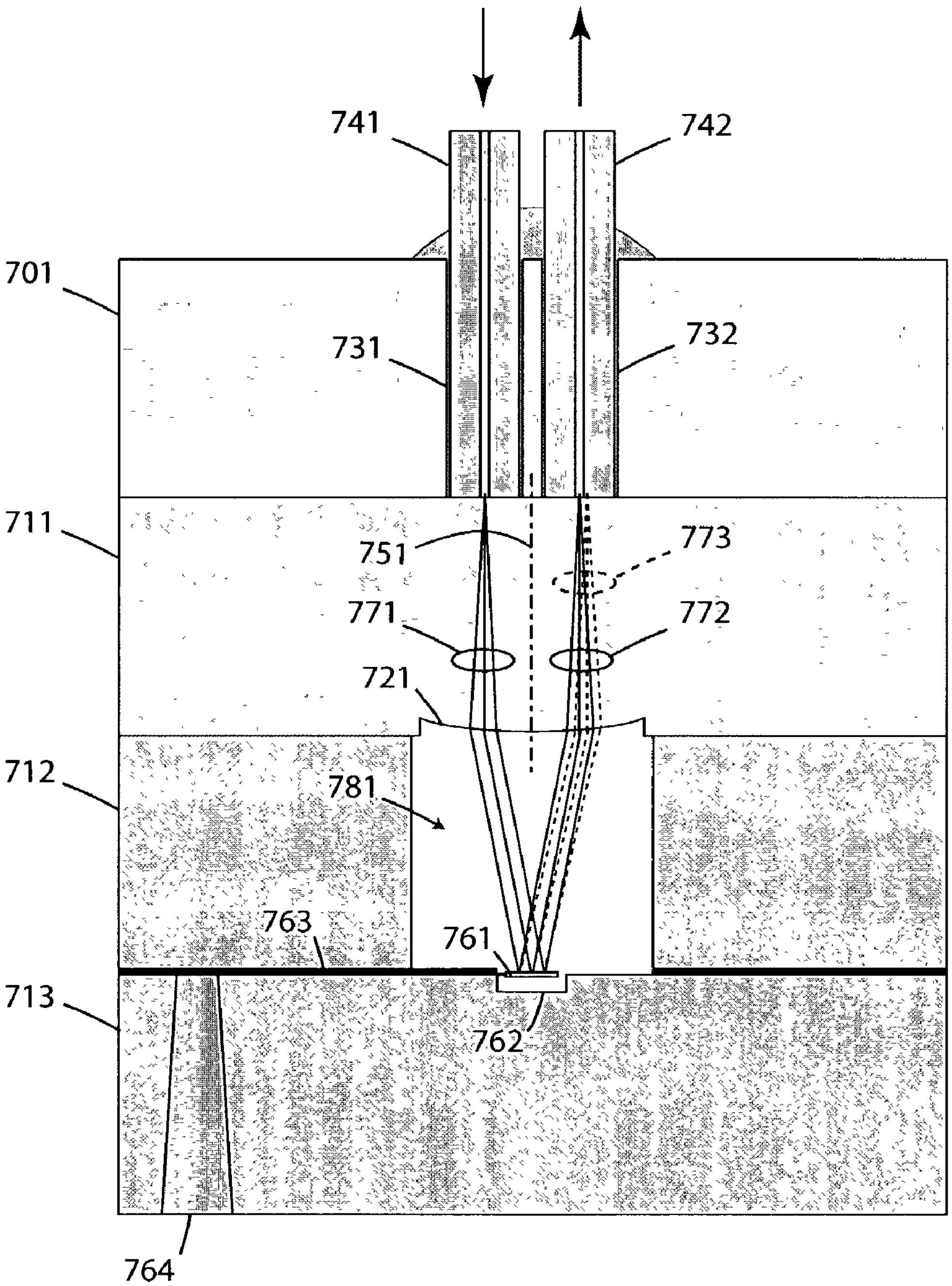
FIG. 7 is a cross-section of a variable optical attenuator device.
Figure 8:
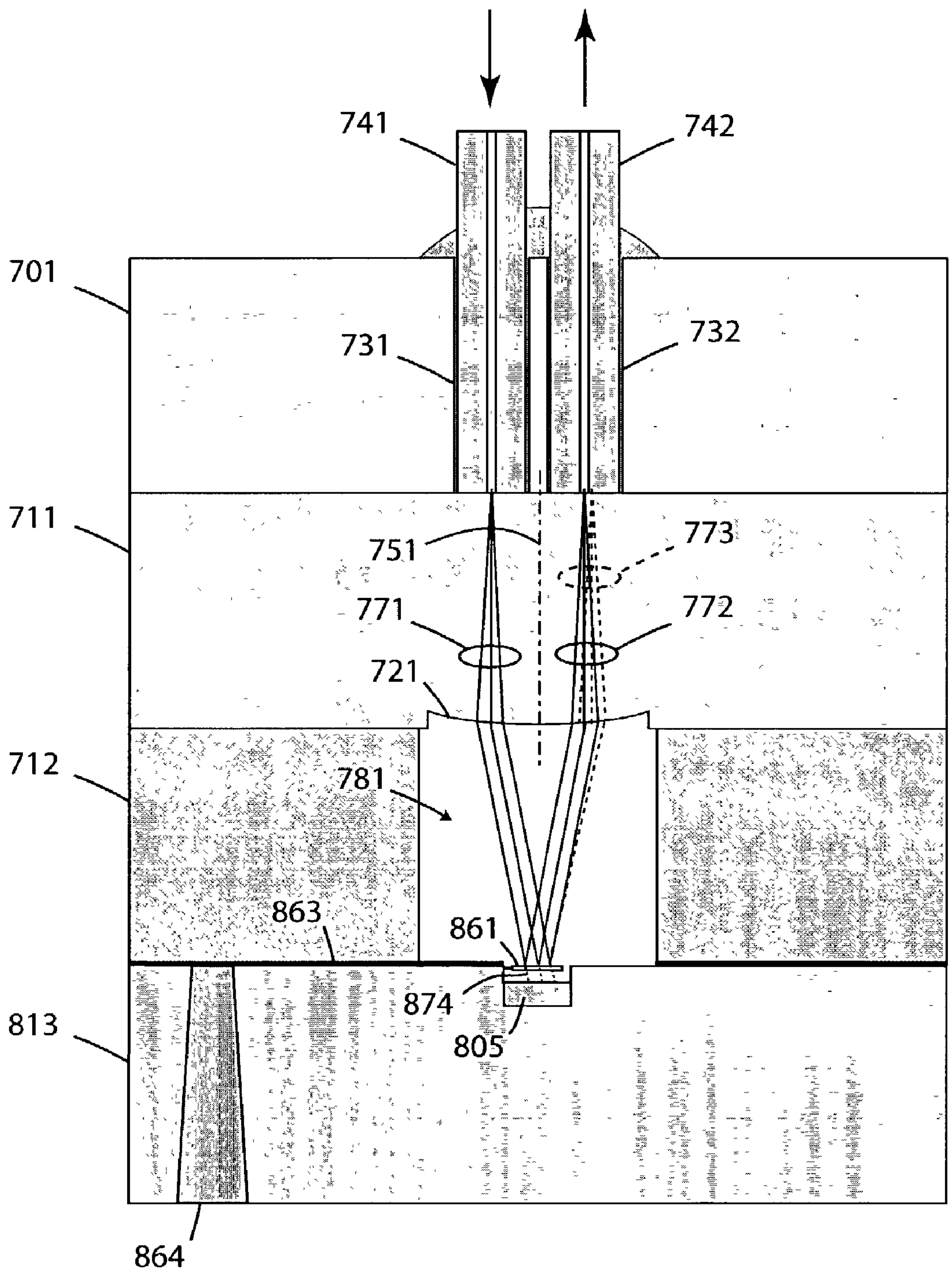
FIG. 8 is a cross-section of the variable optical attenuator device that further includes a photodetector.

Reference is made to FIGS. 7 and 8 to illustrate a VOA that includes an active device (e.g. an actuable mirror) that can be controlled to vary the amount of light coupled out. FIG. 7 is a cross-sectional view of an embodiment that includes a socket layer 701 having a plurality of sockets extending therethrough, and first, second, and third component layers 711, 712, and 713 attached thereto. The socket layer comprises any suitable material such as silicon, and the component layers comprise any suitable material such as glass or silicon.

The socket layer 701 includes a plurality of sockets formed in a predetermined alignment with respect to the other optical components in the structure. Particularly, the socket layer 701 comprises a first socket 731 that receives a first optical fiber 741 and a second socket 732 that receives a second optical fiber 742. The optical fibers are arranged within their respective sockets so that their ends are proximate to the interface between the socket layer and the adjacent component layer. The optical fibers typically comprise single mode fibers such as used for telecommunications purposes; however, other optical fibers, such as multimode fibers, may be used.

The first component layer 711 includes a microlens 721 whose focal plane is proximate to the interface between the socket layer 701 and the first component layer 711. Because each of the optical fibers is arranged within its respective socket so that its end is proximate to the interface between the socket layer and the component layer, the focal planes of the microlens approximately coincides with the ends of the first and second optical fibers 741 and 742.

Each of the first and second sockets 731 and 732 are aligned with respect to the microlens 721 so that the cores of the optical fibers are off-axis from a central axes 751 defined by the microlens. In FIG. 7, the cores of the first and second fibers are positioned on opposite sides of the first central axis 651 and approximately equidistant therefrom.

The third component layer 713 comprises a MEMS (micro-electro-mechanical system) mirror 761 formed on the upper surface of the layer 713. The MEMS mirror 761, which may be approximately centered on the optical axis 751, is formed in an opening 762 by any suitable technique, and in one embodiment the MEMS mirror comprises single crystal silicon, and the second and third component layers 712 and 713 comprises silicon. A VOA electrode 763 is provided on the upper surface of the layer 713 in electrical contact with the MEMS mirror. The VOA electrode 763 is electrically coupled to a metal-plated hole 764 in the layer 713, such as a via hole or a deep-etched large through hole plated with metal. Therefore, an electrical control signal can be applied to the MEMS mirror through the bottom side of the device using the metal-plated hole 764 and the VOA electrode 763. In operation, as voltage is applied to the VOA electrode 763, the MEMS mirror 761 is pulled down by the electrostatic force between the VOA electrode and the silicon wafer, which acts as the other electrode.

For description purposes the first fiber 741 provides an input beam 771, and the second fiber receives a reflected beam 772 to provide an output, although the inputs and outputs could be reversed. In operation, the two fiber sockets 731 and 732 set the positions of the two fibers 741 and 742 offset from the optical axis 751 of the microlens, and therefore the input beam 771 and the output optical beam 772 form approximately the same angle with the mirror 761 when the mirror is in a neutral position with no voltage applied. As a result, substantially all the optical power will be coupled into the output fiber 742 as long as the MEMS mirror 761 is in the neutral position with no voltage applied. As voltage is increasingly applied to the VOA electrode, the MEMS mirror is pulled down by the electrostatic force between the VOA electrode and the silicon wafer, which acts as the other electrode, misaligning the reflected beam with the core of the output fiber. As misalignment increases the output light decreases in power as coupling efficiency drops. Eventually, the reflected beam will completely miss the output fiber thereby reducing output light power to about zero.

The second component layer 712 provides an opening 781 between the microlens 721 and the MEMS mirror 761. The layer 712 may comprise silicon, and the opening 781 may be formed by a wafer-level process such as DRIE etching that creates a through hole in the wafer. When the component layers 711, 712, and 713 are bonded together such as described elsewhere herein, the through holes become hermetically sealed and thus, the opening 781 is hermetically sealed. Some embodiment of MEMS fiber optic components require hermetic packaging in order to satisfy environmental requirements. By hermetically sealing the opening 781 where the MEMS mirror resides, the other parts of the VOA structure will not require hermetic packaging, which would be the conventional expensive hermetic packaging practice. As a result, very low cost device packaging can be employed. In one method, the component layers can be hermetically sealed by using ring shaped solder patterns.

FIG. 8 is a cross-section of an alternative embodiment to the VOA of FIG. 7. Many of the elements are the same; however the embodiment of FIG. 8 additionally includes a photodetector section 805 provided in a third component layer 813. The photodetector 805 can be monitored to provide input power-level feedback so that a smart VOA device can be made at ultra-low cost. In the embodiment of FIG. 8, a MEMS mirror 861 is constructed similar to the MEMS mirror 761 in FIG. 7 except that the MEMS mirror 861 is partially transparent so that a small percent of the input light beam 771, as shown at 874, is transmitted through. The MEMS mirror 861 may be made of single crystal silicon for improved reliability.

The photodetector 805 and the third component layer 813 comprises any suitable material. In the embodiment of FIG. 8, third component layer 813 comprises a photodetector, such as InP. In some embodiments, the speed of the photodetector is not critical, which is one consideration in selecting a material. The third component layer 813 includes electrodes 863 formed on its upper surface and a metal-coated hole 864, which provides an electrical connection to the MEMS mirror 861 and the photodetector. During operation, the photodetector is monitored to determine the power level of the input beam. As in FIG. 7, the second component layer 712 includes the opening 781, and wafer level hermetic packaging can be implemented to protect the MEMS mirror 861 at low cost.

Fiber Optic Switch

Figure 9:
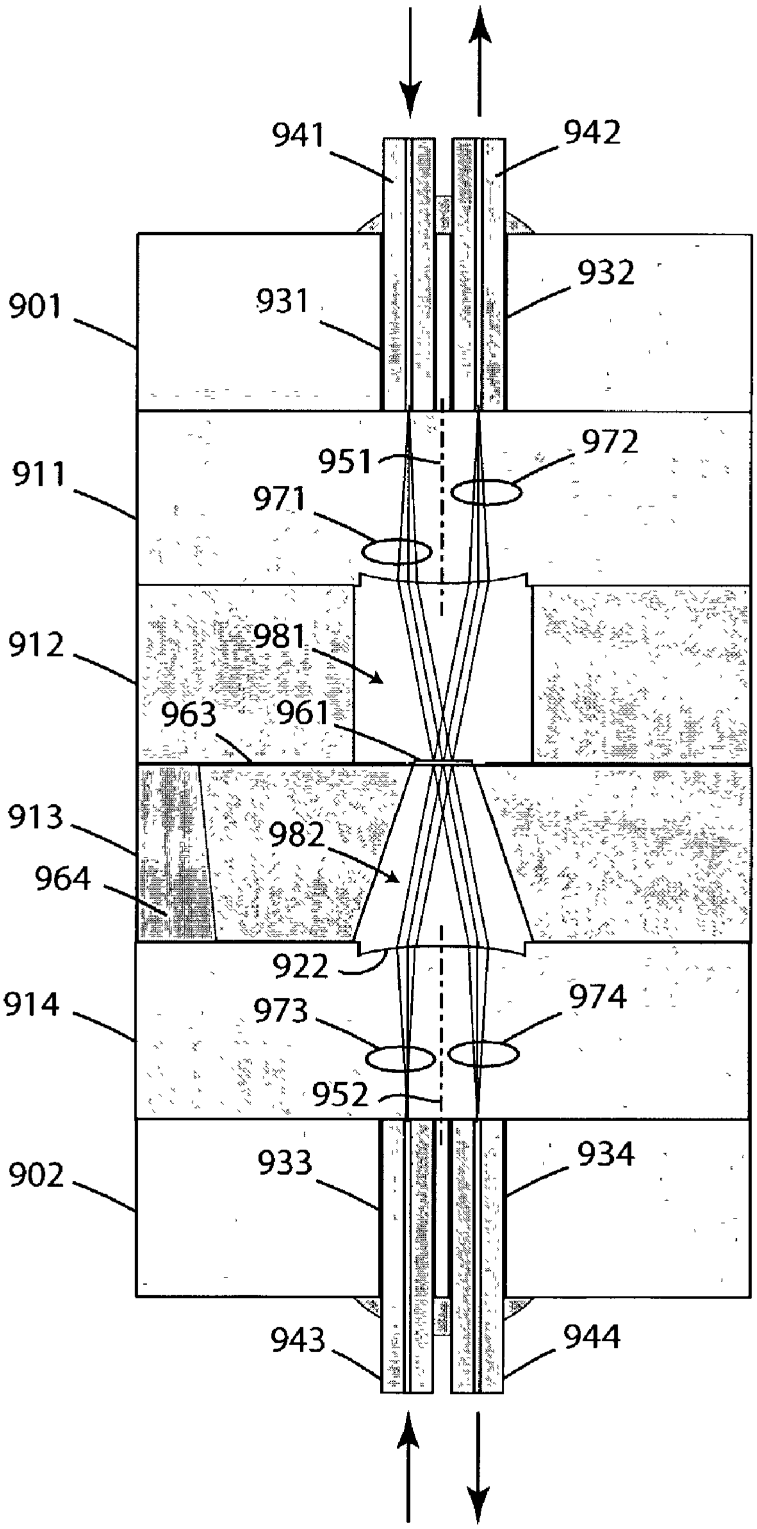
FIG. 9 is a cross-sectional view of an integrated 2×2 switch that shows a switch mirror in the closed position.
Figure 10:
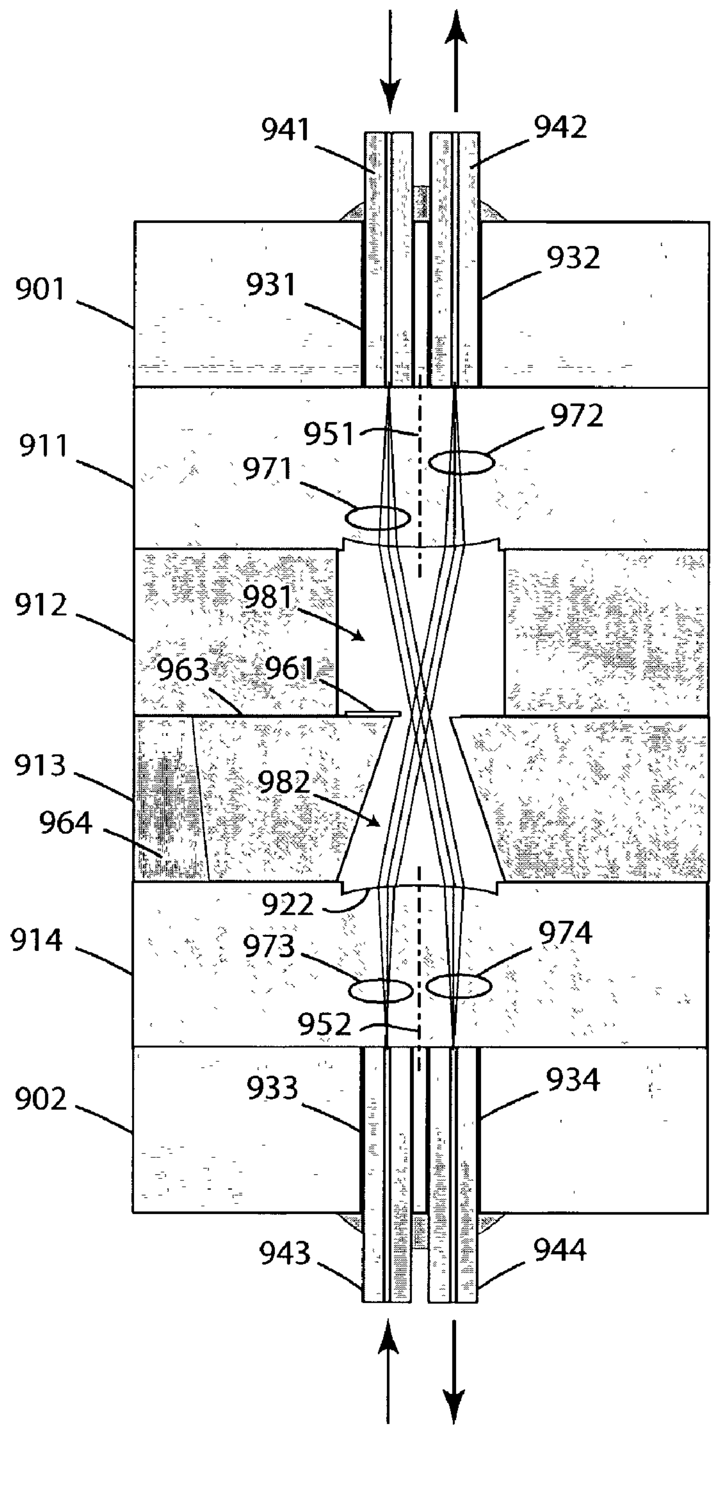
FIG. 10 is a cross-sectional view of an integrated 2×2 switch that shows the switch mirror in the open position.

Reference is now made to FIGS. 9 and 10 to describe an integrated 2×2 fiber optic crossbar switch array that uses a mirror with two states to switch an optical input signal between two output fibers.

FIG. 9 is a cross-sectional view of an integrated 2×2 switch that includes a first socket layer 901 and a second socket layer 902 that have a plurality of sockets extending therethrough. First, second, third, and fourth component layers 911, 912, 913, and 914 are situated between the first and second socket layers. The socket layers comprise any suitable material such as silicon, and the component layers comprise any suitable material such as glass or silicon as appropriate.

The first and second socket layers 901 and 902 include a plurality of sockets formed in a predetermined alignment with respect to the other optical components in the structure. The first socket layer 901 comprises a first socket 931 that receives a first optical fiber 941 and a second socket 932 that receives a second optical fiber 942, arranged in a proximate relationship to each other. The second socket layer 902 comprises a third fiber socket 933 that receives a third optical fiber 643 and a fourth socket 644 that receives a fourth optical fiber 644, arranged in a proximate relationship to each other. The optical fibers are arranged within their respective sockets so that their ends are proximate to the interface between the socket layer and the adjacent component layer. The optical fibers typically comprise single mode fibers such as used for telecommunications purposes; however, other optical fibers, such as multimode fibers, may be used in some embodiments.

The first and fourth component layers 911 and 914 each include a microlens, and may comprise a glass material. Particularly, the first component layer 911 includes a first microlens 921 whose focal plane is proximate to the interface between the first socket layer 901 and the first component layer 911. The fourth component layer 914 includes a second microlens 922 whose focal plane is proximate to the interface between the second socket layer 902 and the fourth component layer 914. Because each of the optical fibers is arranged within its respective socket so that its end is proximate to the interface between the socket layer and the component layer, the focal planes of the microlenses approximately coincide with the ends of the respective optical fibers.

Each of the sockets is aligned with respect to its respective microlens so that its optical fiber is off-axis from the central axes defined by the microlenses. Particularly, the first microlens 921 defines a first central optical axis 951 that is offset from the core of the first and second fibers 941 and 942. The second microlens 922 defines a second central optical axis 952 that is offset from the core of the third and fourth fiber 943 and 944. In the embodiment shown in FIG. 9, the first and second optical axes 951 and 952 are approximately aligned with each other, and have approximately the same optical power. Furthermore, the cores of the first and second fibers are positioned on opposite sides of the first central axis 951 and approximately equidistant therefrom, and likewise the cores of the third and fourth fibers are positioned on opposite sides of the second central axis 952, and approximately equidistant therefrom.

A mirror 961 that is reflective on both sides is provided approximately equidistant between the first and second microlenses. The mirror 961, which may be approximately aligned with the optical axes 951 and 952, is formed by any suitable technique. For example, the mirror can be made by conventional MEMS techniques and in one embodiment comprises single crystal silicon. The MEMS mirror provides two states (e.g. open and closed), and has any suitable configuration; for example it can be a sliding mirror or a torsion mirror. A sliding mirror has one advantage in that, in the event of a power loss, the sliding switch is latched on to the pre-power loss state.

The spacing between the microlenses and the mirror is provided respectively by the second and third component layers 912 and 913, both of which may comprise silicon. In one embodiment the MEMS (micro-electro-mechanical system) mirror 961 is formed on the upper surface of the third layer 913. Each of the layers 912 and 913 has an opening to allow light to propagate from the microlens to the mirror; particularly, the second layer has an opening 981 between the first microlens and the mirror, and the third layer has an opening 982 between the second microlens and mirror.

An electrode 963 is provided on the upper surface of the layer 913 in electrical contact with the mirror 961. The electrode 963 is electrically coupled to a terminal 964 in the layer 913 that is exposed along the side. The terminal 964 may be formed by any suitable technique such as first creating a via hole or a deep-etched large through hole plated with metal, and then dicing the wafer to expose the metallized hole. Therefore, an electrical control signal can be applied to the MEMS mirror through the terminal 964 and the electrode 963. In operation in one embodiment, when voltage is applied to the electrode 963, the MEMS mirror 961 is pulled into one state down by the electrostatic force between the mirror and the adjacent layer, which acts as the other electrode.

Reference is now made to FIG. 10, which is a cross-section of integrated 2×2 switch shown in FIG. 9 in a second state. The MEMS mirror 961 is movable between two states (e.g. closed and open). In a first state, shown in FIG. 9, the MEMS mirror 961 reflects the inputs from both optical paths of two crossing beams to the adjacent optical fiber. In a second state, shown in FIG. 10, the MEMS mirror has been moved out of both optical input paths, thereby allowing the input beam to propagate to the opposite optical fiber. For example, in the first state shown in FIG. 9, if the first fiber 941 provides a first input beam 971, then the first input beam 971 is reflected to provide a first output beam 972 to the second fiber 942. Similarly, if the third optical fiber 943 receives a second input beam 973, then it is reflected by the mirror to provide an output beam 974. However, in the second state as shown in FIG. 10, the mirror 961 has been moved to allow the beams to propagate therethrough: particularly, in the second state the first input beam 971 provides the first output beam 974, and the second input beam 973 provides the first output beam 972.

It may be noted that the two fiber sockets 931 and 932 set the positions of the two fibers 941 and 942 offset from the optical axis 951 of the microlens, and therefore the first input beam 971 and the first output beam 972 form approximately the same angle with the mirror 961 when the mirror is closed as in FIG. 9. As a result, substantially all the optical power will be coupled from the first fiber 941 into the second fiber 942 as long as the MEMS mirror 961 is in the reflecting position.

In the 2×2 switch embodiment of FIG. 9, the MEMS mirror is reflective on both sides, and therefore, when the MEMS mirror is in the optical path, it reflects the two input signals from both sides simultaneously. In another embodiment, a 1×2 switch can be provided by omitting the third optical fiber 943; and in such embodiments the mirror 961 need only be reflective on one side.

One advantage of the two-state MEMS switch is that it is completely digital: the mirror may be in one of two distinct, mechanically-stable positions. As a result, the fiber switch is insulated from vibration and electrical disturbance problems.

The second and third component layers 912 and 913 provide the openings 981 and 982 between the microlens 921 and the MEMS mirror 961. If, for example the layers 912 and 913 comprise silicon, then the openings 981 and 982 may be formed by a wafer-level process such as DRIE etching that creates a through hole in the wafer. When the four component layers 911, 912, 913, and 914 are bonded together such as described elsewhere herein, the through holes become hermetically sealed and thus, the openings 981 and 982 become hermetically sealed. This can be useful because some embodiments of MEMS fiber optic components require hermetic packaging in order to satisfy environmental requirements. By hermetically sealing the openings 981 and 982 where the MEMS mirror resides, the other parts of the switch structure will not require hermetic packaging, which would be the conventional expensive hermetic packaging practice. As a result, a very low cost device packaging can be implemented. In one method, the component layers can be hermetically sealed by using ring shaped solder patterns.

Dual-Pass Tunable Filter

Figure 11:
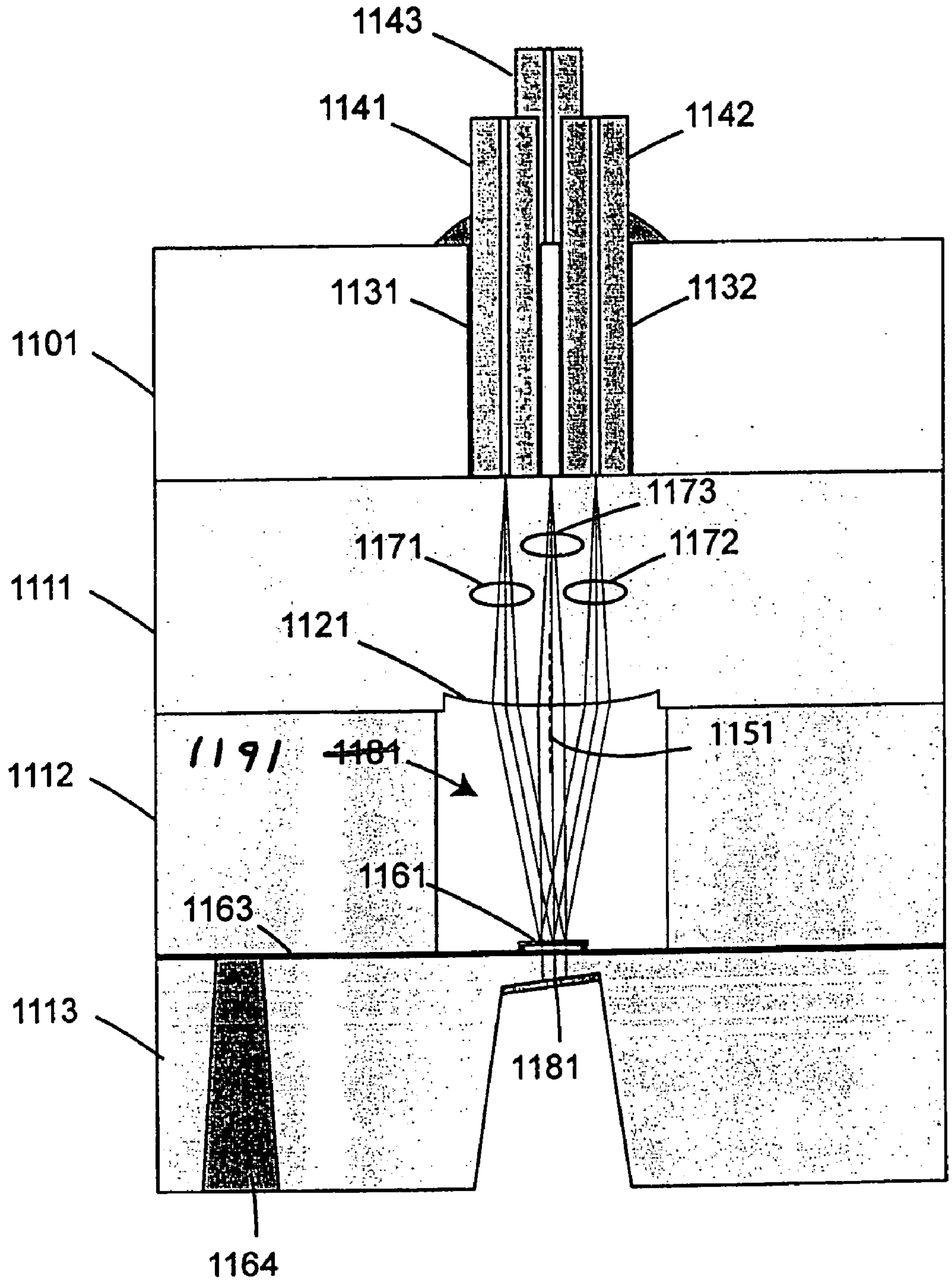
FIG. 11 is a cross-sectional view of a dual-pass tunable filter that utilizes a MEMS Fabry-Perot etalon and an angled mirror to select the wavelength.

FIG. 11 is a cross-sectional view of a dual-pass tunable filter that utilizes a MEMS Fabry-Perot etalon and an angled mirror to select the wavelength. The tunable filter is a versatile device, well-suited for wavelength agile networks.

FIG. 11 shows the structure of the device, including a socket layer 1101 having a plurality of sockets formed therein, and first, second, and third component layers 1111, 1112, and 113 attached thereto. The socket layer comprises any suitable material such as silicon, and the component layers comprise any suitable material such as glass or silicon. In one embodiment the socket layer comprises silicon, the first component layer comprises glass, and the second and third component layers comprise silicon.

The socket layer 1101 includes a plurality of sockets formed in a predetermined alignment with respect to the other optical components in the structure. Particularly, the socket layer 1101 comprises a first socket 1131 that receives a first optical fiber 1141, a second socket 1132 that receives a second optical fiber 1142, and a third socket (not shown) that receives a third optical fiber 1143. The optical fibers are arranged within their respective sockets so that their ends are proximate to the interface between the socket layer and the adjacent component layer. The optical fibers typically comprise single mode fibers such as used for telecommunications purposes; however, other optical fibers, such as multimode fibers, may be used.

The first component layer 1111 includes a microlens 1121 whose focal plane is proximate to the interface between the socket layer 1101 and the first component layer 1111. Therefore, the focal plane of the microlens approximately coincides with the ends of the first, second, and third optical fibers. Each of the first, second, and third sockets are aligned with respect to the microlens 1121 so that the cores of the optical fibers are off-axis from the central axes 1151 defined by the microlens. In one preferred embodiment of the tunable filter, the cores of the first, second, and third fibers are approximately equidistant from the central axis and from each other, so that their ends approximately define an equilateral triangle.

The third component layer 1113 comprises a tunable etalon 1161 formed on its upper surface, which provides the tuning mechanism of the dual pass tunable filter. The tunable etalon comprises two high reflectivity thin film mirrors that are separated by a gap, forming a high finesse resonator that controls the resonant wavelength. In some embodiments only one wavelength transmits through the etalon cavity between the two mirror while all other signals are reflected. The tunable etalon 1161 may be constructed by MEMS (micro-electro-mechanical system) techniques.

The gap between the two high reflectivity mirrors is controlled electrostatically by applying a voltage. Particularly, by varying the voltage, the optical gap distance (i.e. the optical distance between the two mirror of the etalon) can be varied, which change the wavelength transmitted. An electrode 1163 is provided on the upper surface of the third layer 1113 in electrical contact with the etalon 1161 to provide a system to supply a voltage to the etalon. The electrode 1163 is electrically coupled to a metal-plated hole 1164 in the layer 1113, such as a via hole or a deep-etched large through hole plated with metal. In operation, as voltage is applied to the electrode 1163, the etalon 1161 is pulled down by the electrostatic force between the electrode and the silicon wafer, which acts as the other electrode.

An angled mirror 1181 is situated below the tunable etalon 1161. The angled mirror is arranged in a position to reflect light transmitted through the etalon from the first (input) fiber back through the etalon and then to the third optical fiber.

The first fiber 1141 provides an input beam 1171, the second fiber 1142 receives a reflected beam 1172 from the etalon 1161, and the third optical fiber 1143 receives an output beam 1173 transmitted twice through the etalon and reflected from the angled mirror 1181. In one embodiment the placement of the angled mirror 1181 is such that the reflection is at the same incidence angle as that of the beam 1171, although the output beam 1173 is spatially separated from both the input beam 1171 and the etalon-reflected beam 1172.

In operation, the input beam 1171 is incident upon the etalon 1161, and divides into two beams: the beam 1172 reflected from the etalon that includes all wavelengths not transmitted by the etalon, and the output beam 1173 that comprises the wavelength selected by the etalon. Because the input beam 1171 is incident upon the etalon at an angle, the etalon-reflected beam 1172 is coupled into the second optical fiber 1142 using the off-axis arrangement of the first microlens 1121. The beam transmitted through the etalon is reflected by the angled mirror 1171, passing again through the etalon (thereby providing further wavelength selectivity) and then is coupled into the third optical fiber 1143.

In comparison with conventional tunable filter, this arrangement provides the reflected signal without the use of an external circulator. In conventional tunable filters, the transmitted signal passes through the resonant cavity only once, which limits the dynamic range of the tunable filter. In comparison, by providing a reflecting mirror near the resonant etalon cavity as described herein, the transmitted signal is reflected back through the resonant cavity. Advantageously, this dual-pass arrangement increases the dynamic range of the filter.

The spatial orientation of the angled mirror 1181 is defined by any suitable technique. One way is to cut a silicon wafer with a special orientation so that the (111) plane of the silicon wafer forms the correct orientation. By suitable wet etching of the silicon wafer, the (111) mirror plane will be exposed. A high reflection coating is then deposited on this surface to form the angled mirror with the desired orientation.

The second component layer 1112 provides an opening 1191 between the microlens 1121 and the tunable etalon 1161. The layer 1112 may comprise silicon, and the opening 1191 may be formed by a wafer-level process such as DRIE etching that creates a through hole in the wafer. When the component layers 1111, 1112, and 1113 are bonded together such as described elsewhere herein, the through holes become hermetically sealed and thus, the opening 1191 is hermetically sealed.

Multi-Wavelength Laser Transmitter Device

Figure 12:
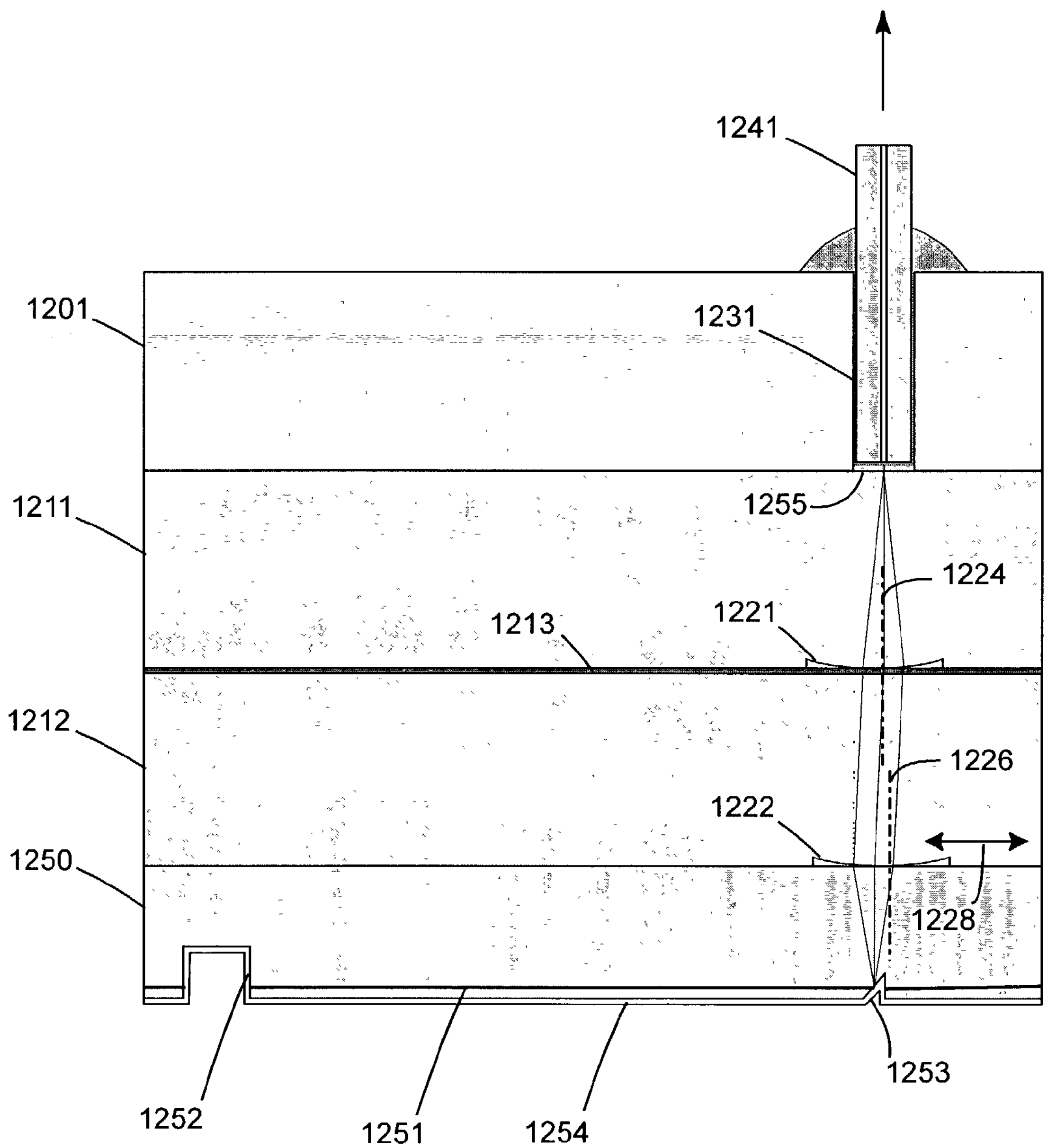
FIG. 12 is a cross section of a laser transmitter.

Reference is made to FIG. 12 to show a waveguide device, and specifically a laser transmitter design (sometimes termed an "external cavity" laser herein) that can be used to create a multi-wavelength laser array. As will be described, the laser output wavelength of this laser device is determined by the alignment between the components in the device, and thus a different wavelength can be predetermined for individual devices by the patterning process. A multi-wavelength array can be created by patterning the devices and dicing them in such a way that multiple lasers at multiple wavelengths are in the same block, each emitting a different wavelength into its respective fiber port.

FIG. 12 is a cross section of a laser transmitter that includes a socket layer 1201, a first component layer 1211 bonded to the socket layer, a second component layer 1212, a planar Fabry-Perot etalon layer 1213 formed on the second component layer 1212 and situated between it and the first component layer, and a laser layer 1250 bonded to the second component layer. The socket layer 1201 includes a socket 1231 that receives an optical fiber 1241.

The first component layer includes a first microlens 1221 that has its focal plane approximately at the interface between the socket layer and the first component layer. The first microlens 1221 has a central axis 1224 that is arranged slightly off-axis with the core of the optical fiber 1241. The second component layer comprises a second microlens 1222 having a central axis 1226. By varying the position of the central axis 1226 laterally with respect to the laser turning mirror 1253 in the manufacturing process as indicated by the arrows 1228 (i.e. from side-to-side), the wavelength can be varied as a result of changing the angle of incidence of the laser emission upon the Fabry-Perot etalon 1213.

The laser layer 1250, which comprises a suitable semiconductor material such as InP, includes an in-plane waveguide (laser area) 1251. A laser facet 1252 is made on the bottom surface of the laser layer by etching a vertical wall into the InP semiconductor material. A 90° turning mirror 1253 is defined by etching a 45° slanted surface so that light is reflected upward. Both the vertical facet 1252 and the 90° turning mirror 1253 can be made by ion milling, for example. To protect the etched surfaces, the bottom surfaces of the laser layer are protected by layer 1254 such as a PECVD dielectric layer deposition.

A laser cavity is defined between the laser facet 1252 and a partial reflector 1255 that is situated proximate to the end of the fiber 1231. Particularly, the laser cavity follows a path that for illustration purposes begins at the laser facet 1252 and reflects at about 90° from the turning mirror 1253. Upon leaving the turning mirror, the light beam begins to expand in the laser substrate due to lack of confinement and broadens to a large area by the time it arrives at the upper surface of the laser. Upon exiting the upper surface, the second microlens 1222 collimates the laser beam before it hits the Fabry-Perot etalon 1213, which operates to select the laser wavelength. The laser beam is then collimated again by the first microlens 1221 and hits at normal incidence the partial reflector 1255 that forms the other laser facet. Some of the light incident upon the partial reflector 1255 is reflected to provide the output, and some is reflected to provide feedback to the laser.

The electrodes of the laser (not shown) may all be provided on the outside of the structure. In one embodiment the laser can be mounted to a heatsink p-side down for heat extraction.

Possible advantages of the external cavity laser design described herein include multi-wavelength capability, elimination of wavelength locker, the thermoelectric (TE) cooler is not required, low chirp, high speed direct modulation possible, high power, simple Fabry-Perot dielectric etalon fabrication, no butterfly packaging required for hermetic sealing, integrated photodetector can be included, and no fiber alignment cost since it pre-aligned in the fabrication process.

Multi-wavelength by design: The laser wavelength is determined by the incidence angle of the light beam at the Fabry-Perot etalon. The incidence angle, in turn, is defined by the relative position of the upward divergent laser beam with respect to the second microlens 1222. As a result, by varying the side-to-side position of the etched turning mirror 1253 with respect to the second microlens 1222 in the fabrication process, the lasing wavelength can be varied. Since these devices are fabricated in large quantities on a single wafer, lasers with many different laser wavelengths can be created. By designing the devices to provide multiple wavelengths on the same wafer stack, multi-wavelength laser transmitter arrays can be built.

Wavelength locker not necessary: Since Fabry-Perot etalons with very low temperature coefficients can be made, the temperature coefficient of the laser can be made very low. This results in the elimination of the wavelength locker.

TE cooler not required: Normal DFB lasers have high temperature coefficient. However, due to the Fabry-Perot etalon which has low temperature coefficient, the external cavity laser may have low temperature coefficient. This may lead to the elimination of a TE cooler. A simple heatsink can be used in place of a TE cooler for lower manufacturing cost.

Low chirp, high speed direct modulation: It has been reported that an external cavity laser may have much reduced wavelength chirp in direct modulation, because the wavelength selective element is detached from the laser gain medium; particularly a 15 GHz directly modulated laser has been reported with low chirp in an external cavity laser with fiber Bragg grating as one laser facet, for example in Paoletti et al, "15 Ghz Modulation Bandwidth, Ultralow-Chirp 1.55-μm Directly Modulated Hybrid Distributed Bragg Reflector (HDBR) Laser Source, IEEE Photonics Technology Letters, Vol. 10, No. 12, December 1998, pp. 1691–1693. The direct modulation speed depends on the laser cavity length. Compared to the laser reported therein, a shorter laser cavity length may be achieved using the integrated external cavity laser structure as shown in FIG. 12. As a result, even 10 Gb/s direct modulation with low wavelength chirp could be achieved in some embodiments.

High power, simple Fabry-Perot laser: Because there is no sophisticated laser regrowth steps involved, external cavity lasers can offer higher power compared to normal DFB lasers.

Simple Fabry-Perot dielectric etalon fabrication: The dielectric Fabry-Perot etalon is manufactured with a uniform Fabry-Perot etalon.

No butterfly packaging: The external cavity laser does not require butterfly type hermetic package due to the fact that the etched laser surfaces are all protected by dielectric films. An integrated waveguide photodetector may be made on the other side of the vertical laser facet to monitor the laser power output. The waveguide photodetector is reverse biased.

No additional fiber alignment cost: The external cavity laser array is naturally integrated with the fiber socket so that fiber alignment costs are eliminated.

External Cavity Tunable Laser

Figure 13:
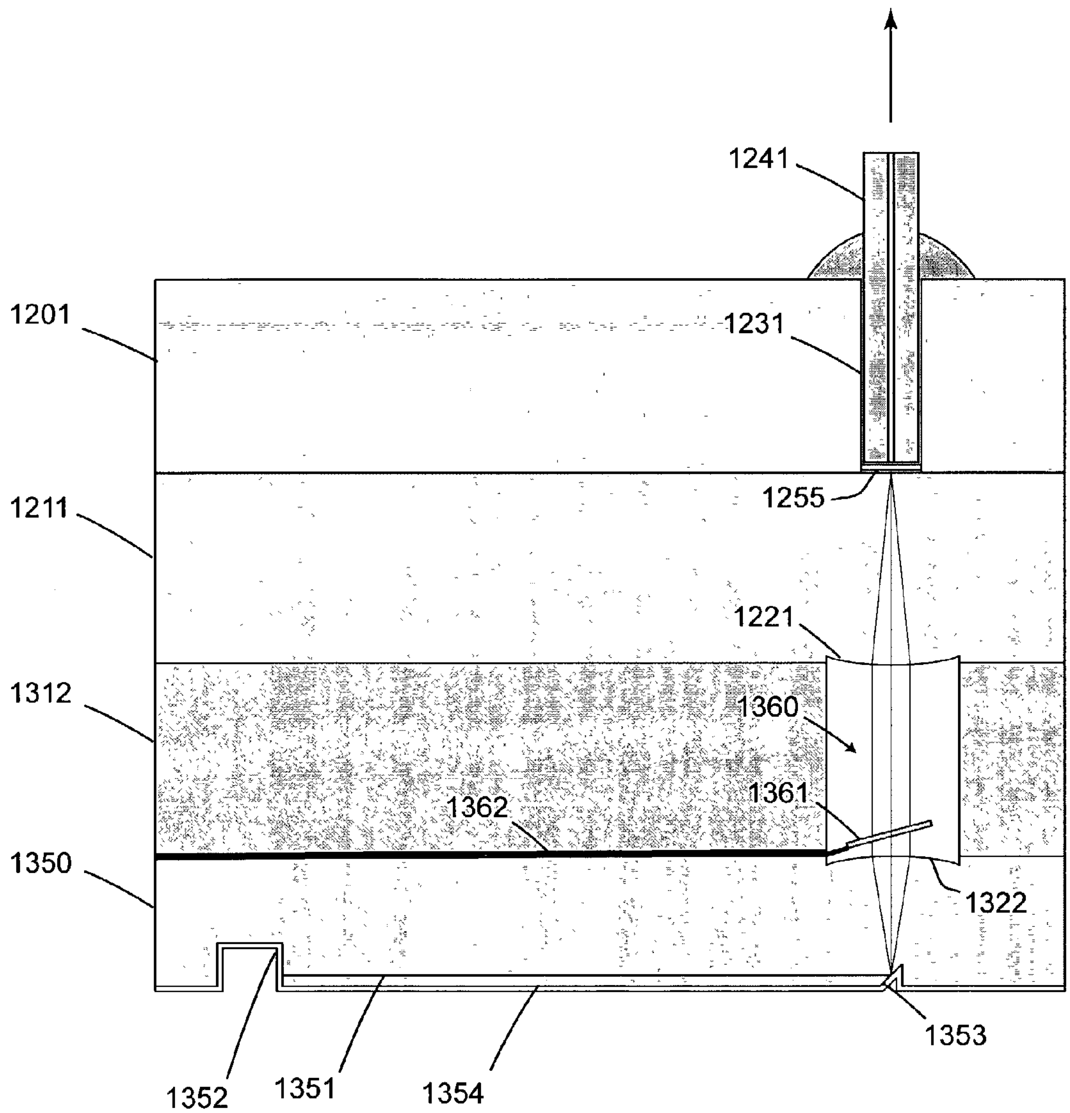
FIG. 13 is a cross-section of an integrated external cavity tunable laser device that emits a single wavelength and is actively tunable across a wavelength range.

FIG. 13 is a cross-section of an integrated external cavity tunable laser device that emits a single wavelength and is actively tunable across a wavelength range. The tunable laser in FIG. 13 uses some of the principles and elements described in the multi-wavelength laser transmitter design of FIG. 12 described, but instead of the passive etalon in FIG. 12 it uses a tilting ultra-narrow passband Fabry-Perot MEMS etalon to provide wavelength selection.

This device has four layers bonded together including the socket layer 1201 and the first component layer 1211 described above. A laser layer 1350, which may comprise InP, resembles the laser layer 1250 in FIG. 12, including a laser facet 1352 formed on the lower surface, a 90° turning mirror 1353, an in-plane laser area 1351 between the laser facet and the turning mirror, and the lower surface has a coating 1354 to protect etched surfaces. In addition a second microlens 1322 is formed on the upper surface of the laser layer, which operates to collimate the laser beam from the turning mirror 1353. The second component layer 1312, which may comprise silicon, includes an opening 1360 that operates as a spacer between the first and second microlenses 1221 and 1322. The second component layer 1312 also includes a tilting Fabry-Perot etalon 1361 deposited on a MEMS structure, which is actuable by a using a signal applied to an electrode 1321. The tilting MEMS Fabry-Perot etalon 1361 provides the wavelength selection mechanism by changing the angle of incidence. A laser cavity is defined between the laser facet 1352 and a partial reflector 1255 that is situated proximate to the end of the fiber 1231.

The external cavity tunable laser of FIG. 13 shares most of the advantages of the multi-wavelength laser transmitter design of FIG. 12. For example, the electrodes of the laser are all on the outside of the structure. The tunable laser can be mounted p-side down to a heatsink for excellent heat extraction. Wafer level hermetic packaging is used for low packaging cost. In some embodiments, additional optical components may be included (e.g. additional component layers) to prevent the tunable laser from mode-hopping.

Integrated Pump/Signal Combiner Array

Figure 14:
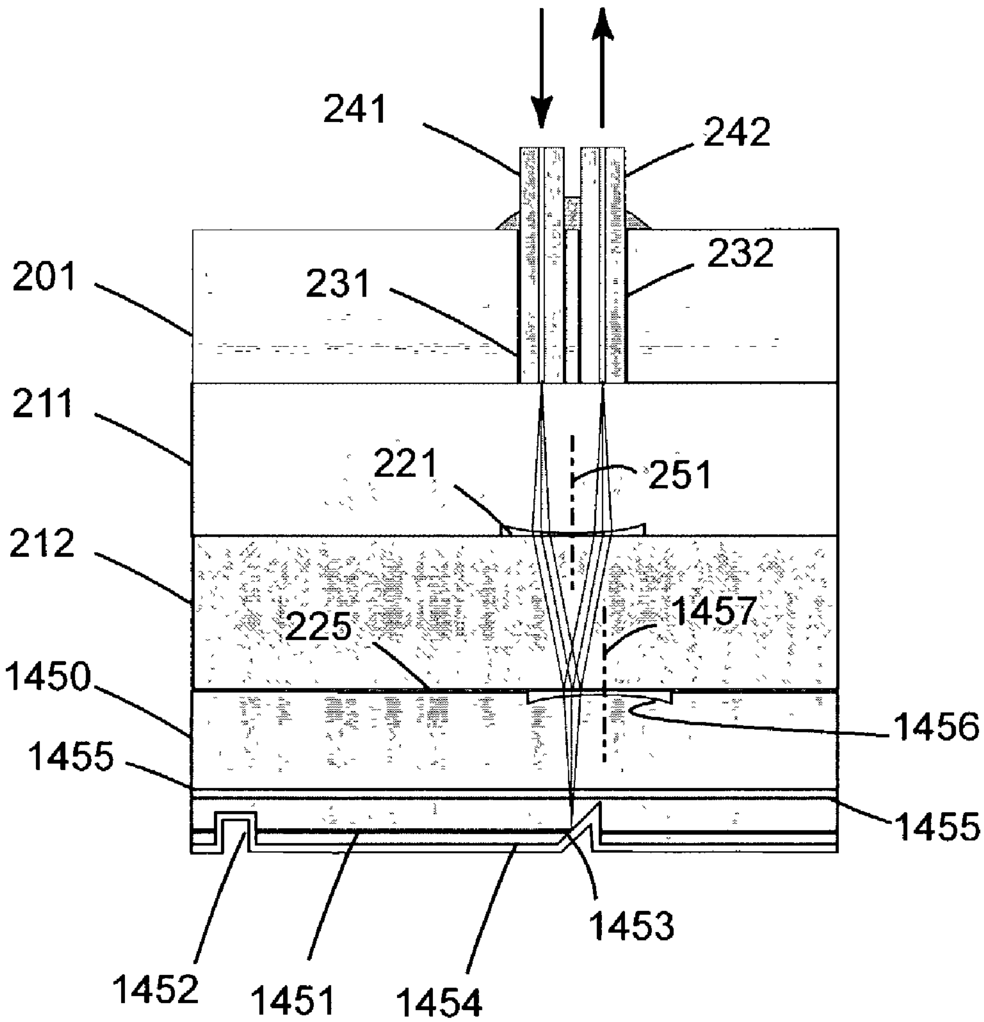
FIG. 14 is a combination of an in-plane pump laser integrated with a fiber-coupled filter structure.

FIG. 14 is a combination of an in-plane pump laser integrated with a fiber-coupled filter structure such as disclosed with reference to FIG. 2. The resulting device can be used to provide a pump laser beam and combine it with an optical signal to be amplified by an erbium-doped waveguide amplifier for example. Arrays of these devices can be used to pump erbium doped waveguide amplifier arrays.

The fiber-coupled filter structure is described with reference to FIG. 2, including the socket layer 201 that includes first and second sockets 231 and 232 for receiving and positioning first and second optical fibers 241 and 242, the first component layer 211 bonded to the socket layer 201, and the second component layer 212 that includes a WDM filter 225 formed on its lower surface. The WDM filter is designed to have a center frequency that transmits the pump laser beam and reflects the signal beam. The first component layer includes the first microlens 221 that defines the first optical axis 251 that is offset from, and approximately equidistant between, the cores of the first and second optical fibers.

The filter structure, and specifically the second component layer 212, is connected to a laser layer 1450, which may comprise GaAs, for example, which would provide an emitting wavelength of about 980 nm. The laser layer 1450 includes a laser facet 1452 formed on the lower surface, a 90° turning mirror 1453, an in-plane laser area 1451 between the laser facet and the turning mirror, and the lower surface has a coating 1454 to protect etched surfaces. A Bragg reflector mirror 1455 is formed in the laser layer, which operates together with the laser facet 1452 to form a laser cavity.

A second microlens 1456 is formed on the upper surface of the laser layer, which receives the laser beam output from the turning mirror 1453. A central axis 1457 defined by the second microlens is offset from the propagation direction of the laser beam from the turning mirror 1453. As a result, when the output of the pump laser strikes the bottom microlens on the other side of the laser substrate, the collimated beam tilts to the right due to the off-axis arrangement of the laser with the second microlens. The pump laser beam, which has a wavelength about the center wavelength than the WDM filter 225, then transmits through the WDM filter coating. The first microlens 221 is arranged so that the pump laser beam then is coupled into the second optical fiber 242 on the top right.

In operation a relatively weak optical signal enters the device through the first optical fiber 241. The optical signal, which has a wavelength different than the center wavelength of the WDM filter, is reflected by the WDM filter 225, thereby combining the optical signal with the strong pump laser output generated by the pump laser diode. The combined light beam is then coupled into the second (output) optical fiber 242 using the first microlens 221. The second (output) fiber may then be connected to an EDWA input port for amplification of the weak signal, using the pump beam to optically pump the erbium-doped fiber.

Vertical Fiber Integration Process

U.S. patent application Ser. No. 09/327,826, now U.S. Pat. No. 6,328,482 B1, entitled "Multilayer Optical Fiber Coupler", incorporated by reference herein, discloses fiber socket technology for aligning a single mode fiber with optical components on other lasers. Herein, the fiber socket technology disclosed in the '482 patent may be utilized as part of the process to make ultra-low cost optical fiber components. In this process, referred to as "vertical fiber integration" (VFI) technology, multiple wafers are bonded together into a wafer stack for device integration in the wafer surface-normal (vertical) direction, in contrast to current planar waveguide technology.

The VFI technology is a fiber optic component manufacturing technology in which dense two-dimensional array of identical, functional fiber optic devices are created in the surface normal direction of the wafer stack. Each device includes a passively-aligned optical fiber with all necessary fiber passive alignment structure via the fiber socket technology. For example, in a six-inch diameter wafer stack, some 18,000 pre-aligned and vertically integrated devices can be created with 1 $mm^2$ die sizes. These devices are separated into chips with a suitable number of devices in arrayed form on each chip. As a result of this technology, time consuming active alignment operations are eliminated, and very substantial cost savings (e.g. two orders of magnitudes) may be realized.

One advantage of VFI technology is the possibility to achieve ultra-low cost manufacturing of fiber optic components. Therefore it is useful to consider cost in each and every step of the manufacturing process. For example, in addition to photolithographic processing for batch manufacturing, the fiber insertion and device packaging could also be low cost.

The possibility of consistent low cost manufacturing is one advantage of vertical fiber integration technology over other fiber optic component manufacturing technologies, for example, that of Digital Optics Corporation (DOC) in North Carolina. In DOC technology, wafers are bonded together into wafer stacks with vertical optical circuits. The wafer stacks are diced into chips and fiber v-groove arrays are then actively aligned and attached to the chips. Apparently the cost of fiber alignment and packaging dominates in this process and the final cost is believed to be significantly higher than that of vertical fiber integration technology.

Figure 15:
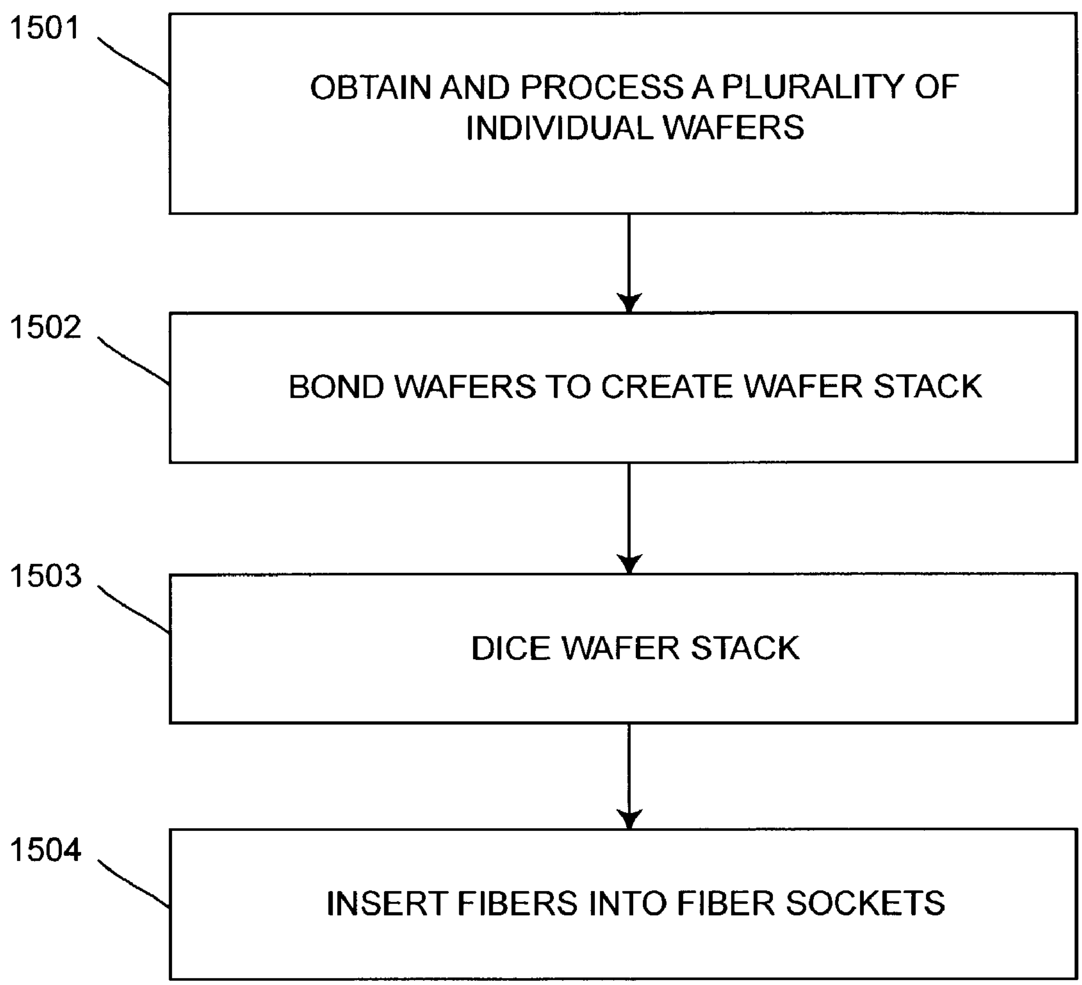
FIG. 15 is a flow chart that illustrates general operations to form a device using the VFI technology.

FIG. 15 is a flow chart that illustrates general operations to form a device using the VFI technology. This process can be illustrated with four basic steps: 1) individual wafer processing as shown at 1501, 2) wafer bonding as shown at 1502, 3) wafer stack dicing as shown at 1503, and 4) fiber insertion as shown at 1504. Reference may also be made to FIG. 1 to describe these steps.

Step 1. Individual Wafer Processing

At 1501, in a first step a plurality of wafers, which may be silicon, glass or some other suitable material, are obtained and processed in a series of sub-steps using photolithographic means to create two-dimensional arrays of components as required for the particular device to be constructed. Each wafer has a specific pattern with a certain function and/or optical functioning element. The 2-D array of patterns on different wafers are designed with a one-to-one correspondence, so that when the wafers are precisely aligned and permanently bonded together, the patterns on all the wafers form an integrated optical circuit in the surface-normal direction. These elements may include precise vertical holes, microlenses, dielectric thin film filters, mirrors, lasers, and detectors, for example.

Sockets are created to receive the optical fibers. One method for creating the sockets is described with reference to FIGS. 16A to 16D; however other methods could be used. For single mode fiber applications, the fibers may be spatially positioned with about 1 micron alignment accuracy or less. Since the two-dimensional array of patterns on a wafer can be created using photolithography with location errors of less than 0.1 micron, their locations have negligible error with this process.

In one embodiment the fiber sockets comprise photolithographically-defined, vertical through holes (about 500 $\mu$m deep) with a diameter of about 126 $\mu$m sized to closely match that of the optical fiber. Proper orientation is important, because when the fiber is inserted into the fiber socket, its position and angular orientation are defined by the fiber socket. Positional alignment precision of less than 1 micron can be achieved using the fiber socket.

After two or more wafers with precisely defined two-dimensional patterns are being aligned to each other, if two vertically integrated circuits on two opposite sides of the wafer are aligned, all other vertically integrated devices on the same wafer stack are automatically aligned. This feature can be used to eliminate individual active alignment such as used in conventional fiber optic component manufacturing processes.

Step 2. Wafer Bonding

At 1502, in a second step after individual wafers are patterned, they are precisely aligned using alignment fiducials, such as shown in the '482 patent, to each other and the wafers are permanently bonded to provide a wafer stack. Each and every die needs to be permanently bonded. Due to the photolithographic creation of the two-dimensional patterns, when two vertical optical circuits are precisely aligned, all the vertical optical circuits on the wafer stack are aligned.

The VFI technology allows many different kinds of materials to be integrated together. Since the thermal expansion properties of the materials can be different, it may be useful to conduct the wafer bonding at lower temperatures to avoid the buildup of thermal stress. A solder bonding method is disclosed with reference to FIGS. 17, 18, and 19; however other method can be used. Examples of bonding methods include anodic bonding, epoxy bonding, metal bonding, glass-frit bonding, wafer direct bonding, and polyimide bonding. If epoxy bonding is utilized, then it may be useful to deposit a thin layer of epoxy, let it begin curing, and then bond the two layers, which would reduce unwanted upwelling of epoxy into the fiber sockets. In embodiments that include glass and silicon layers, anodic bonding is a particularly useful technology for bonding the silicon layer to the glass layer.

Step 3. Wafer Stack Dicing

At 1503, after wafer bonding, the wafer stack is diced into chips as illustrated in FIG. 1 with a small number of vertical optical circuits on each chip using any suitable technique such as cutting with a diamond saw. This way, devices in individual form or arrayed form can both be made with the same level of manufacturing ease.

Step 4. Fiber Insertion

At 1504, optical fibers are then inserted into the sockets in the chips, such as shown at 140 in FIG. 1, and permanently affixed using epoxy for example. Possible epoxy materials include UV-cured epoxy and thermally cured epoxy.

Making a Fiber Socket

One method for making the vertical fiber alignment hole is a-dry-etched silicon round hole made by using a silicon deep RIE etcher. The etching process may be the Bosch process, although other processes to create a dry etched hole in silicon may be possible.

However, the fiber socket may be formed by other methods. In the numerous optical fiber devices disclosed herein, the fiber socket may be created in a number of ways, which should be construed to include all possible ways to create a vertical hole.

Silicon holes patterned from both sides: Reference is now made to FIGS. 16A, 16B, 16C, and 16D. When creating two fiber sockets with very close proximity as disclosed herein in dual fiber type devices, it may be useful to etch the silicon hole from both sides of the wafer rather than from one side. It has been found experimentally that as the wafer is etched deeper, the etched hole loses fidelity in shape compared to the original photomask. This problem is especially severe when two patterns are closely placed on the original photomask, which creates the so called "microloading" effect. As a result of microloading, etching a mask pattern that begins with two closely-positioned holes and a small gap in between will result in the two holes merging together at the other side. This phenomenon is more severe when photoresist is the etch mask and less severe when an oxide etch mask is used.

FIGS. 16A–16D disclose a method in which an etch mask is patterned on both sides of the wafer, and then etched from each side.

Figure 16A:
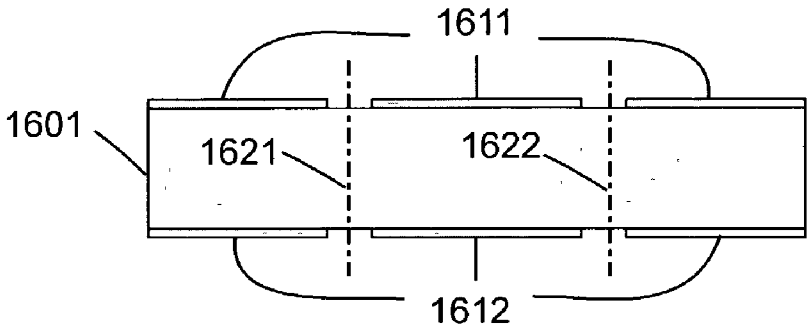
FIGS. 16A, 16B, 16C, and 16D disclose a two-sided etching method suitable for fabricating socket layers.

FIG. 16A is a cross-section of a silicon wafer 1601 that has a first oxide etch mask 1611 formed on its upper surface and a oxide etch second mask 1612 formed on its lower surface. Both masks include openings where the optical fibers are to be formed, and the openings are aligned. Particularly, a first set of openings is aligned about a first centerline 1621, and a second set of openings is aligned about a second centerline 1622. In one method, the steps of patterning the oxide masks on both sides of the wafer include growing a thermal oxide on both sides of a double-side polished wafer, then the first mask 1611 is formed on the upper surface by photolithography and etching of the oxide film, and then the lower surface is aligned and the second mask 1612 side is formed by photolithography and etching the oxide film on the lower surface.

Figure 16B:
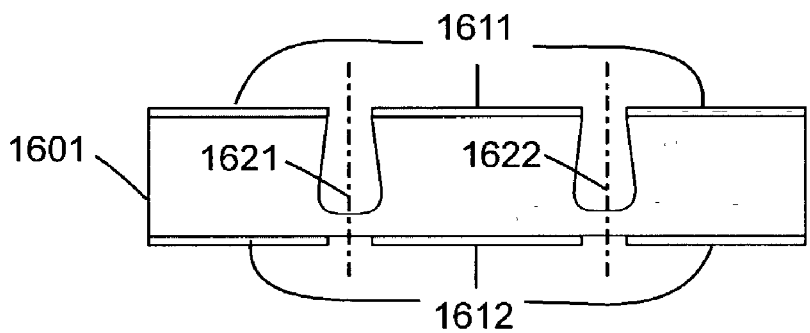

Referring to FIG. 16B, the upper surface exposed through the mask 1611 is etched about one-half to substantially more than one-half of the thickness of the wafer 1601, but without going through the lower surface. Under suitable conditions, deep DRIE etching creates trenches with a reentrant profile. FIG. 16B is a cross-section that shows first and second etched holes 1631 and 1632, etched respectively about the first and second centerlines, which is the result of etching from the upper surface.

Figure 16C:
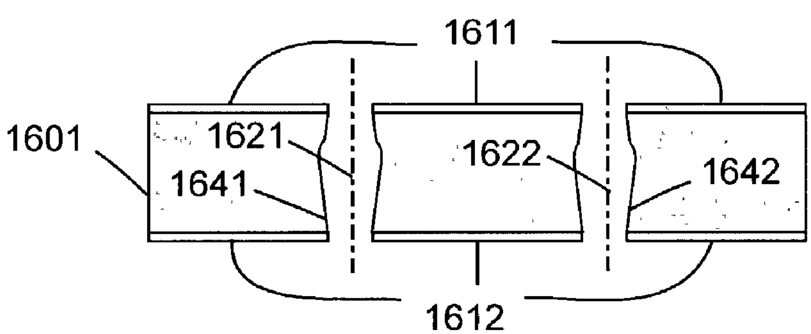

Referring to FIG. 16C, the lower surface exposed through the second mask 1612 is etched by a process such as deep RIE etching until first and second sockets 1641 and 1642 are formed respectively about the centerlines 1621 and 1622.

Figure 16D:
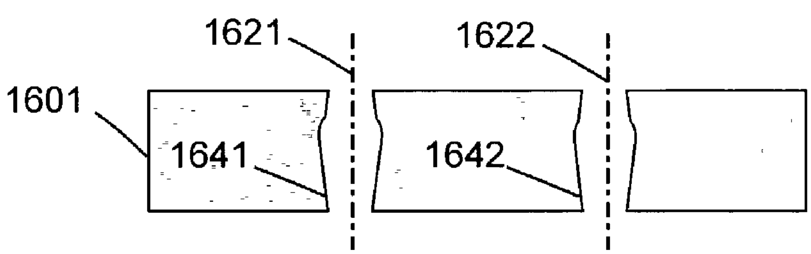

Referring to FIG. 16D, the first and second oxide masks are stripped using a suitable process, such as hydrofluoric acid etching to form the final socket wafer.

It has been found that etching from both sides of the wafer as described herein results in well-defined rims on both sides of the fiber hole. In some embodiments, the hole diameters on the photomask on the insertion side of the hole may be made larger than that of the other side to facilitate the fiber insertion process.

Other methods for forming the fiber socket: Although the dry etched silicon hole, etched from both sides is a preferred method for creating the socket wafer for fiber passive alignment, other methods of making the fiber socket are possible with varying degrees of convenience and performance.

For example other methods include wet etching of a diamond shaped vertical hole in a (110) silicon wafer, and plating a round hole using a LIGA process on the back of the microlens wafer. In the LIGA process, tall cylinders of polymer are created on a wafer surface, and thick metal is plated using the cylinders as molds. After the polymer is removed, round through holes in metal are created.

Still another possibility in making the fiber socket is by dry etching through a material other than silicon.

Shape of the fiber socket: The shape of the hole may be varied as may be useful or necessary. For example, round holes with vertical grooves on the vertical sidewalls can be used to facilitate the epoxy in escaping from the bottom of the round hole during the fiber insertion process.

Surface orientation of the fiber socket wafer: Since the fiber socket defines the position of the optical fiber, the side of the fiber socket wafer with the highest precision should be the side of the fiber socket wafer directly bonded to the microlens wafer.

If the fiber socket is created using an etch mask on only one surface of the wafer, that wafer surface should be the surface that is bonded to the microlens wafer; otherwise there may not be sufficient precision to ensure efficient coupling.

If the fiber socket wafer is created by etching from both wafer surfaces, the wafer surface with the smaller fiber hole diameter should be bonded to the microlens wafer so that the fibers are more precisely positioned by the fiber sockets.

Wafer Bonding Process Using Solder Bonding

Figure 17:
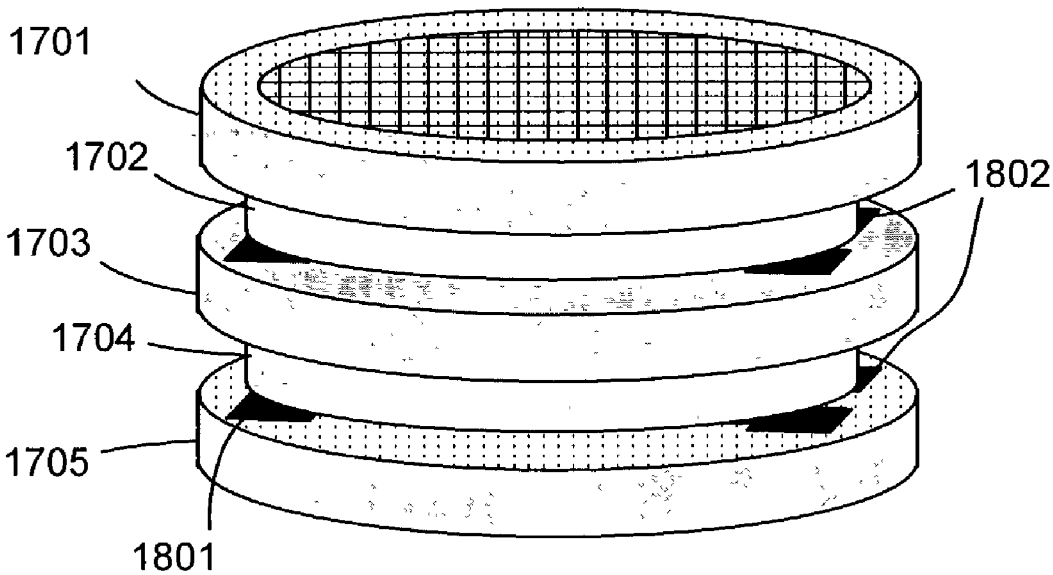
FIG. 17 is perspective view of a plurality of wafers of alternating diameter aligned and bonded together using the metal soldering technique.
Figure 18:
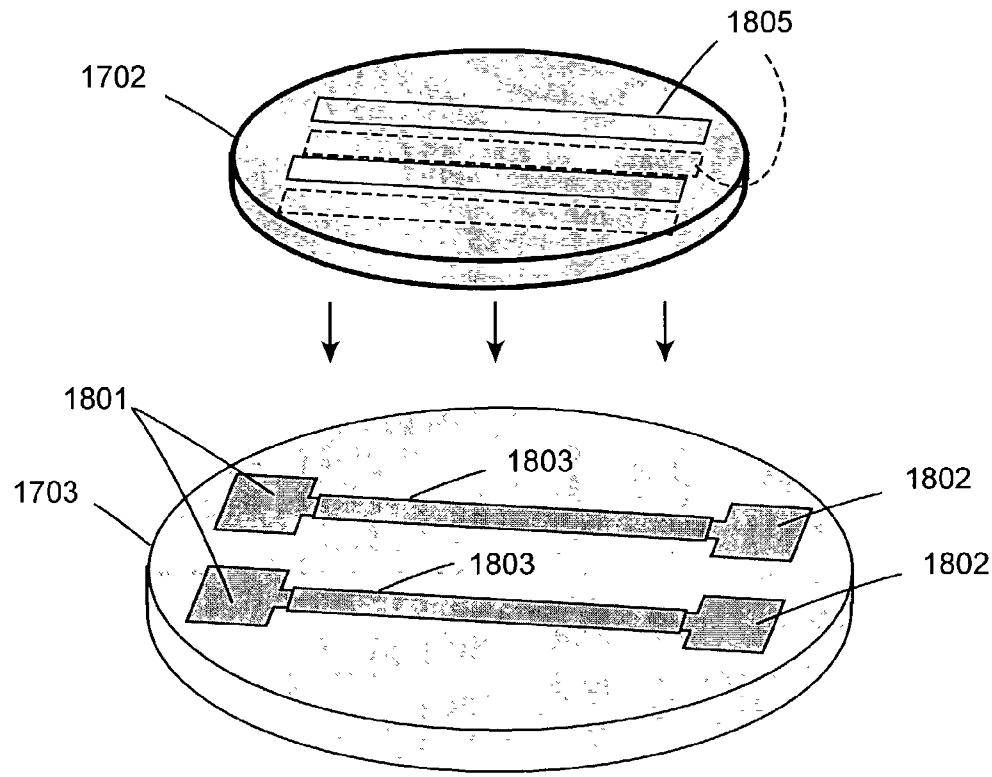
FIG. 18 is an exploded view of a smaller diameter wafer and a larger diameter wafer, showing structures used in the metal soldering technique.
Figure 19:
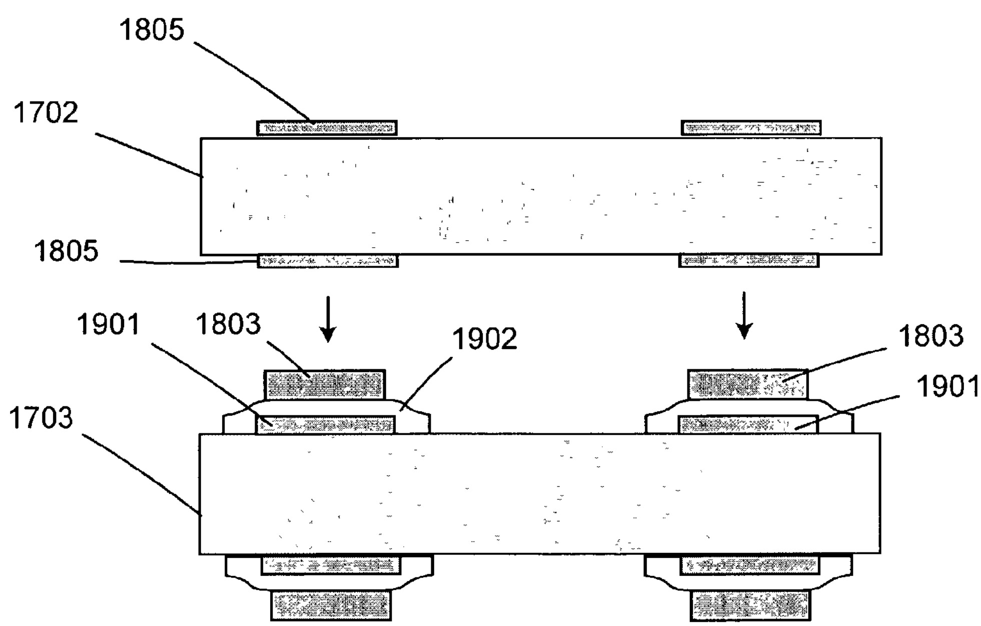
FIG. 19 is a cross-sectional view of the smaller diameter wafer and the larger diameter wafer of FIG. 18.

Reference is now made to FIGS. 17, 18, and 19. One embodiment of wafer bonding process for the device structures is metal solder bonding. One advantage of this process is the low temperature bonding, which could lead to room temperature bonding capability. In this process multiple embedded electrical thin film heaters are individually activated by running electrical current through them, which melts and reflows the solder wires nearby. The solder wires bond the wafers together without heating the whole wafer.

FIG. 17 is perspective view of first, second, third, fourth, and fifth wafers 1701, 1702, 1703, 1704, and 1705 aligned and bonded together. The wafers are arranged with alternating wafer diameters; particularly, the first, third, and fifth wafers have a larger diameter than the second and fourth wafers.

FIG. 18 is an exploded view of the second and third wafers 1702 and 1703. As illustrated in FIG. 18, the larger diameter wafers such as the third wafer 1703 have electrical contact areas including first terminal pads 1801 and second terminal pads 1802 that are connected to heat a solder layer 1803. The second wafer 1702, which has a smaller diameter, has a solder layer 1805 in a pattern that matches the solder layers 1803 on the opposing surface of the third wafer.

In the wafer stack of FIG. 17, the terminal pads 1801 and 1802 extend beyond the edges of the smaller diameter second and fourth layers, so that small electrical contact probes can reach in and provide electrical current to each of the terminal pads.

FIG. 19 is a cross-sectional view of the second and third wafers, showing the solder layer 1805 on second (smaller) wafer, the opposing solder layer 1803 on the third (larger) wafer, and a heater structure, which is connected to the terminal pads 1801 and 1802, that includes a metal conductive layer 1901 such as tungsten, covered by an electrical insulator such as an oxide film.

On the smaller diameter wafers, metal solder patterns may be formed by photolithographic liftoff processes on both surfaces of the wafers. On the larger diameter wafers, the metal (e.g. tungsten) heater patterns are formed first, followed by an oxide layer which covers the metal heater patterns, and followed by another layer of solder pattern (e.g. gold-tin) which is directly above the metal heater pattern but insulated from the metal heater pattern by the oxide layer. Both sides of the larger diameter wafers are provided with this structure, except on the outer facing surfaces.

After precise wafer alignment between the two wafers, the two wafers to be bonded are held down by pressure. Pulsed electrical current is sent through the terminal pads to the metal heater wires individually. The generated heat reflows each individual solder pattern in a controlled way without causing significant thermal expansion of the wafer. The reflowed solder pattern balls up due to surface tension and makes contact to the solder pattern on the adjacent wafer. The two solder patterns melt together. This way, any small gap between the two solder patterns is bridged and a constant spacing between the two wafers is maintained by the other solder patterns which are not activated (heated). In some embodiments it may be necessary to place the wafer bonding setup inside an inert environment to facilitate the solder reflow process.

Although FIGS. 18 and 19 show a linear pattern for purposes of illustration, some embodiments can utilize other configurations, such as a circular configuration near the circumference of the wafers. Such a configuration would effectively seal the volume within the circular pattern.

Anti-Reflection Coating

An anti-reflection coating may be desirable for every optical surface in the vertical stack. The AR coating step is done after optical patterns such as microlenses have been formed. In the devices disclosed herein, the steps of AR coating may not be discussed specifically for each device, but may be implemented as desired.

Wafer Level Hermetic Packaging

In fiber optic devices such as lasers, detectors and MEMS switches, it is frequently necessary to enclose environmentally sensitive devices inside a hermetically sealed metal package. Conventionally, these metal packages are expensive, and they exacerbate the difficulty of manufacturing fiber optic components.

Using the vertical fiber integration technology, it is possible to achieve hermetic packaging on a wafer level, for all of the devices contained in the wafer. Particularly, the sensitive spaces such as MEMS cavities are sealed off from the outside environment by the two adjacent wafers bonded together. In the case of solder bonding, the spaces are sealed off by suitably designed solder rings around the cavities. These metal solder rings reflow during the wafer bonding process and hermetically seal the sensitive areas from the outside environment, without any special wafer bonding arrangement. For added reliability, two rings may be used to encircle the same cavity.

With the sensitive areas hermetically sealed by the solder rings, the reliability of a fiber optic component depends on the reliability of the fiber socket, the fiber, and the epoxy. With a suitably chosen uv- or thermal-cured epoxy, it should not be necessary to hermetically seal the fiber sockets in order for the fiber optic component to pass Bellcore environmental tests. Therefore low cost manufacturing of previously hermetically sealed fiber optic components is possible.

Fiber Optic Device Packaging

Because the vertical fiber integration technology provides automatic fiber passive alignment with ultra-low cost, the goal of the device packaging is to provide a rugged fiber device package, rather than to maintain fiber alignment as is currently done in conventional fiber optic device packaging.

The packaging processes may employ low cost injection molding or epoxy potting to encapsulate the vertically integrated optical circuit, which has fibers already inserted into the fiber sockets and fixed permanently with epoxy. Suitable strain relief rubber boots may be provided to ensure the fully packaged devices withstand fiber side pull tests.

Fiber Optic Receiver

Figure 20:
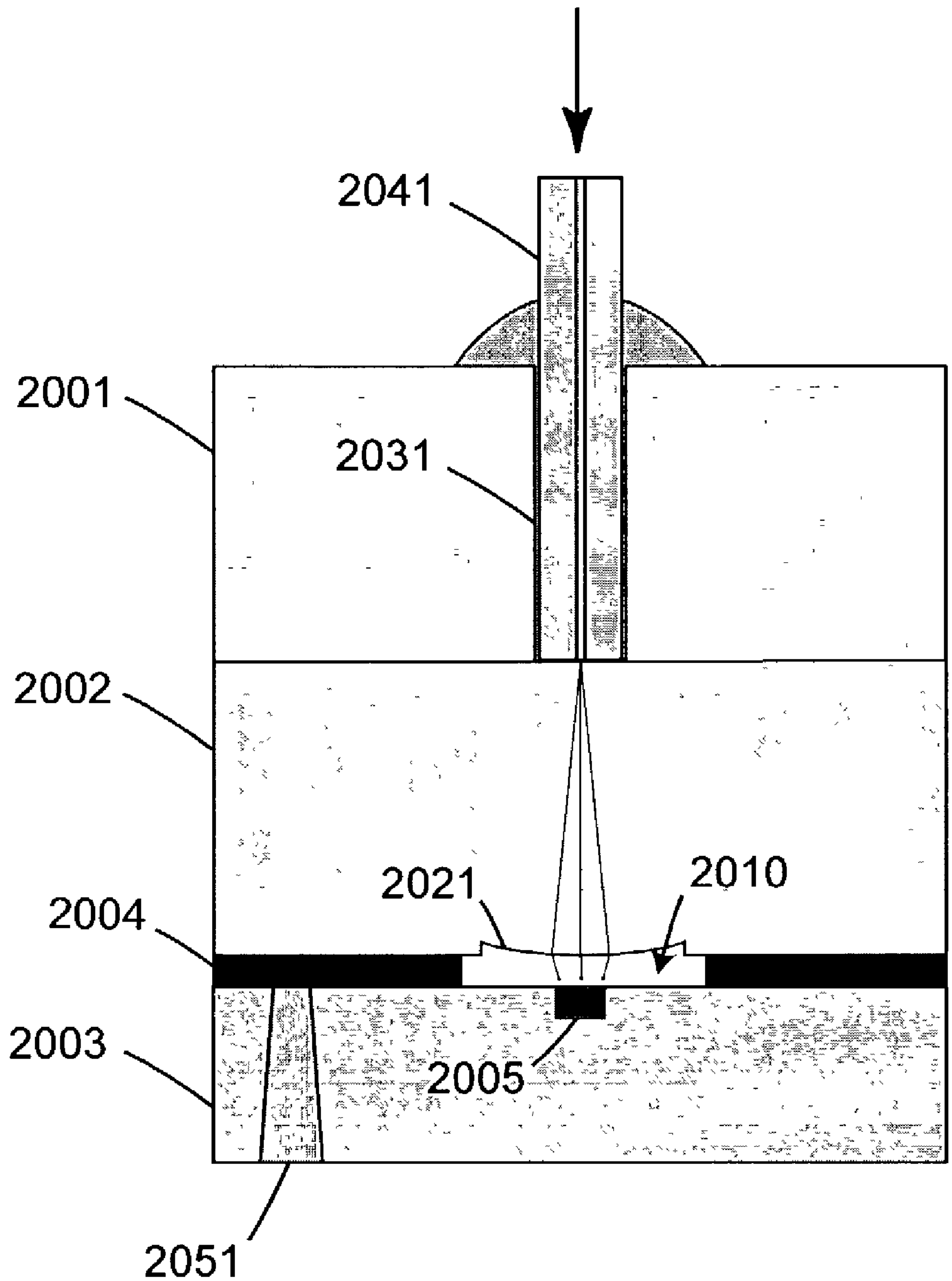
FIG. 20 is a cross-section of an integrated fiber receiver.

FIG. 20 is a cross-section of an integrated fiber receiver, which illustrates an example of a device that can be constructed with the metal solder technique. The receiver in FIG. 20 has a socket layer 2001, a component layer 2002, and a photodetector layer 2003 that is bonded to the component layer by a metal solder technique, such as described with reference to FIGS. 17, 18, and 19. As a result of this bonding technique, a metal solder layer 2004 is situated between the component and photodetector layers, which provides wafer level hermetic packaging. Particularly, the metal solder technique creates a hermetically-sealed opening 2010 between the microlens 2021 and the photodetector section 2002.

The socket layer 2001, which may comprise silicon, includes a socket 2041 for receiving an optical fiber 2041. The component layer 2002 includes a microlens 2021 having a central axis that is aligned with the core of the optical fiber. The photodetector layer includes a photodetector 2005, comprising for example a InGaAs detector, that is arranged to receive input light from the optical fiber 2041 focused by the microlens 2021. The photodetector 2005 and the photoconductor layer 2003 comprise any suitable material, such as InP. Electrical connection can be provided by any suitable connection, such as using wire bonding in the open area or using a via hole 2051 on the photodetector layer. The solder layer 2004, or another electrode may be used to connect the photodetector with a monitoring device.

In operation, the input signal from the optical fiber 2031 is focused by the microlens 2021 and hits the photodetector area 2005. The optical energy is converted to electrical signal by the photodetector, which then provides an appropriate output.

What is claimed is:

1. A vertically integrated optical device, comprising:

a first fiber socket layer having a plurality of sockets including a first socket and a second socket arranged proximate to each other, wherein said first socket is configured to receive a first optical fiber and second socket is configured to receive a second optical fiber;

a plurality of component layers coupled to said fiber socket layer including a first component layer that includes a first optical component and a second component layer that includes a second optical component;

wherein said first and second optical components are arranged to optically couple said first optical fiber with said second optical fiber via said first and second optical components; and a second fiber socket layer coupled to said component layers and situated so that the first and second component layers are arranged between said first and second fiber socket layers, said second fiber socket lay comprising a third fiber socket;

said third fiber socket arranged to receive a third optical fiber, wherein at least one of the said first and second optical components is arranged to optically couple said third optical fiber with at least on of said first and second optical fibers.

2. The vertically integrated optical device of claim 1, wherein said second optical component comprises a lens that defines a central axis, and said first and second optical fibers are aligned offset from said central axis.

3. The vertically integrated optical device of claim 2 wherein said second optical component comprises an actuable mirror, thereby providing a variable optical attenuator device.

4. The vertically integrated optical device of claim 3 wherein said mirror is partiall transparent, and further comprising a photodetector situated opposite said mirror from said optical fibers.

5. The vertically integrated optical device of claim 3, further comprising a spacer layer situated between said first and second component layers, said spacer layer providing a predetermined opening between said first and second optical components.

6. The vertically integrated optical device of claim 5, wherein said predetermined gap is hermetically sealed by said spacer layer.

7. The vertically integrated optical device of claim 2 wherein said second optical component comprises an etalon that includes a first and a second partially reflective surface that defines an optical gap distance, said etalon providing a reflected signal and a transmitted signal, said reflected signal directed to said second optical fiber.

8. The vertically integrated optical device of claim 7, further comprising means for controlling said optical gap distance in said etalon, thereby providing a tunable filter.

9. The vertically integrated optical device of claim 7 further comprising a third optical fiber arranged to receive said transmitted signal.

10. The vertically integrated optical device of claim 7 further comprising a reflector for reflecting said transmitted signal through said etalon in a second pass, thereby providing a dual pass tunable filter.

11. The vertically integrated optical device of claim 7, further comprising a spacer layer situated between said first and second component layers, said spacer layer providing an opening between said first and second optical components.

12. The vertically integrated optical device of claim 11, wherein said opening is hermetically sealed by said spacer layer.

13. The vertically integrated optical device of claim 1, wherein:

said first optical component comprises a first lens that defines a first central axis, and said first and second optical fibers are aligned offset from said first central axis; and said second optical component comprises a second lens that defines a second central axis, and said third optical fiber is aligned offset from said second central axis.

14. The vertically integrated optical device of claim 13 further comprising a dielectric filter situated between said first and second lenses, said dielectric filter arranged so that an input beam from said first optical fiber interacts with said dielectric filter, thereby separating said input beam into a reflected beam that is coupled into said second optical fiber and a transmitted beam that is coupled into said third optical fiber.

15. The vertically integrated optical device of claim 13 further comprising a MEMS mirror situated between said first and second lenses, said MEMS mirror having a first state and a second state, said MEMS mirror arranged so that:

in said first state, a first input beam from said first optical fiber reflects from said MEMS mirror and is coupled into said second optical fiber; and in said second state, said first input beam is coupled into said third optical fiber.

16. The vertically integrated optical device of claim 13 wherein said second fiber socket layer comprises a fourth fiber socket, said fourth fiber socket being configured to receive a fourth optical fiber such that said fourth optical fiber is offset from said second central axis;

said first and second optical components and third socket being configured to optically couple said fourth optical fiber with at least one of said first, second and third optical fibers via said first and second optical components.

17. The vertically integrated optical device of claim 16 further comprising a dielectric filter situated between said first and second lenses, said dielectric filter arranged so that a first input beam from said first optical fiber incident upon said dielectric filter separates said first input beam into a first reflected beam that is coupled into said second optical fiber and a first transmitted beam that is coupled into said third optical fiber; and a second input beam from said fourth optical fiber incident upon said dielectric filter separates said second input beam into a second reflected beam that is coupled into said third optical fiber and a second transmitted beam that is coupled into said second optical fiber.

18. The vertically integrated optical device of claim 16 further comprising a mirror situated between said first and second lenses, said mirror actuable between a first state and a second state, said mirror arranged so that:

in said first state, a first input beam from said first optical fiber reflects from said mirror and is coupled into said second optical fiber;

in said first state, a second input beam from said third optical fiber reflects from said mirror and is coupled into said fourth optical fiber;

in said second state, said first input beam is coupled into said fourth optical fiber; and in said second state, said second input beam is coupled into said second optical fiber.

19. The vertically integrated optical device of claim 1, wherein said second fiber socket layer comprises a plurality of fiber sockets including the third socket and a fourth fiber socket;

wherein said fourth fiber socket is arranged to receive a fourth optical fiber situated in said fourth fiber socket, said first and second optical components and said fourth fiber socket arranged to optically couple said fourth fiber with at least one of said second and third optical fibers via said first and second optical components.

20. The vertically integrated optical device of claim 19, wherein:

said first optical component comprises a first lens that defines a first central axis, and said first and second optical fibers are aligned offset from said first central axis;

said second optical component comprises a second lens that defines a second central axis, and said third fiber socket is arranged such that said third optical fiber is aligned offset from said second central axis; and further comprising a third lens formed in said second component layer proximate to said second lens, and said fourth fiber socket is arranged such that said fourth optical fiber is aligned offset from a central axis of said third lens; and a plurality of WDM filters situated between said first and second component layers.

21. The vertically integrated optical device of claim 20 further comprising a plurality of WDM filters situated between said first and second component layers, including a first dielectric filter situated between said first and second lenses, said first dielectric filter arranged so that an input beam from said first optical fiber is incident upon said first dielectric filter, which separates said input beam into a first transmitted beam that is coupled into said second optical fiber and a first reflected beam; and a second dielectric filter situated between said second and third lenses, said second dielectric filter arranged to receive said first reflected beam, and provide a second transmitted beam that is coupled into said third optical fiber, and a second reflected beam that is coupled into said fourth optical fiber.

22. The vertically integrated optical device of claim 1 wherein said first, second, or third sockets are formed by a process of photolithographic masking and etching of said first and/or second fiber socket layers.

* * * * *